(12) United States Patent
Moore et al.

(10) Patent No.: US 7,904,321 B2
(45) Date of Patent: Mar. 8, 2011

(54) SYSTEMS, METHODS AND COMPUTER PROGRAM PRODUCTS FOR USER-SELECTED CALENDAR AND TASK ALERTS

(75) Inventors: Darryl Moore, Conyers, GA (US); Sharon Carter, Austell, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1167 days.

(21) Appl. No.: 11/589,036

(22) Filed: Oct. 27, 2006

(65) Prior Publication Data
US 2008/0103867 A1    May 1, 2008

(51) Int. Cl.
*G06F 9/44* (2006.01)
(52) U.S. Cl. ............ 705/7; 709/206; 709/201; 709/204; 709/205; 709/207; 709/217; 709/218; 709/219
(58) Field of Classification Search .................. None
See application file for complete search history.

(56) References Cited

U.S. PATENT DOCUMENTS

| | | | | |
|---|---|---|---|---|
| 6,161,137 A * | 12/2000 | Ogdon et al. | ................. | 709/224 |
| 6,598,075 B1 * | 7/2003 | Ogdon et al. | ................. | 709/204 |
| 6,745,193 B1 * | 6/2004 | Horvitz et al. | ................. | 707/796 |
| 6,757,530 B2 * | 6/2004 | Rouse et al. | ............... | 455/412.1 |
| 7,003,525 B1 * | 2/2006 | Horvitz et al. | ........................ | 1/1 |
| 7,046,779 B2 * | 5/2006 | Hesse | ..................... | 379/202.01 |
| 7,107,316 B2 * | 9/2006 | Brown et al. | .................. | 709/207 |
| 7,133,896 B2 * | 11/2006 | Ogdon et al. | ................. | 709/205 |
| 7,143,177 B1 * | 11/2006 | Johnson et al. | ............... | 709/231 |
| 7,233,933 B2 * | 6/2007 | Horvitz et al. | ................... | 706/21 |
| 7,343,312 B2 * | 3/2008 | Capek et al. | ....................... | 705/8 |
| 7,343,313 B2 * | 3/2008 | Dorenbosch et al. | ............. | 705/8 |
| 7,353,465 B2 * | 4/2008 | Callaway et al. | .................. | 705/8 |
| 7,359,936 B2 * | 4/2008 | Gruen et al. | ................... | 709/203 |
| 7,421,281 B2 * | 9/2008 | O'Neill et al. | ................ | 455/519 |
| 7,458,080 B2 * | 11/2008 | Parker et al. | ................... | 719/318 |
| 7,538,685 B1 * | 5/2009 | Cooper et al. | ................. | 340/692 |
| 7,552,228 B2 * | 6/2009 | Parasnis et al. | ............... | 709/231 |
| 7,634,546 B1 * | 12/2009 | Strickholm et al. | .......... | 709/207 |
| 7,756,934 B2 * | 7/2010 | Silver et al. | .................... | 709/206 |
| 2002/0029163 A1 * | 3/2002 | Joao | ................................ | 705/12 |
| 2002/0049836 A1 * | 4/2002 | Shibuya | ......................... | 709/219 |
| 2002/0138582 A1 * | 9/2002 | Chandra et al. | ............... | 709/206 |
| 2002/0178137 A1 * | 11/2002 | Hasegawa | ......................... | 707/1 |
| 2003/0003938 A1 * | 1/2003 | O'Neill et al. | ................ | 455/519 |
| 2003/0055908 A1 * | 3/2003 | Brown et al. | .................. | 709/207 |
| 2003/0120717 A1 * | 6/2003 | Callaway et al. | ............... | 709/201 |
| 2003/0129569 A1 * | 7/2003 | Callaway et al. | ............. | 434/108 |
| 2003/0149802 A1 * | 8/2003 | Curry et al. | .................... | 709/329 |
| 2003/0167310 A1 * | 9/2003 | Moody et al. | ................. | 709/206 |
| 2003/0172116 A1 * | 9/2003 | Curry et al. | .................... | 709/206 |
| 2003/0174826 A1 * | 9/2003 | Hesse | ...................... | 379/210.01 |
| 2003/0177193 A1 * | 9/2003 | Budge et al. | .................. | 709/206 |
| 2004/0002932 A1 * | 1/2004 | Horvitz et al. | .................. | 706/46 |

(Continued)

*Primary Examiner* — Romain Jeanty
*Assistant Examiner* — Brett Feeney
(74) *Attorney, Agent, or Firm* — Cantor Colburn LLP

(57) ABSTRACT

A method for electronic information transfer by a sender. The method includes composing an electronic message, typically a calendar and/or task event, on a sender terminal. At least one announcement file is associated with an attribute of the electronic message, the announcement file configured for playing at a recipient terminal upon the recipient terminal receiving the electronic message. The electronic message and the association to the announcement file is sent over a network to a recipient at the recipient terminal. Embodiments include a computer program product for implementing the method.

20 Claims, 15 Drawing Sheets

U.S. PATENT DOCUMENTS

| | | | |
|---|---|---|---|
| 2004/0003042 A1* | 1/2004 | Horvitz et al. | 709/204 |
| 2004/0032485 A1* | 2/2004 | Stephens, Jr. | 348/14.08 |
| 2004/0034689 A1* | 2/2004 | Kacalek et al. | 709/206 |
| 2004/0064355 A1* | 4/2004 | Dorenbosch et al. | 705/9 |
| 2004/0153453 A1* | 8/2004 | Brodie et al. | 707/10 |
| 2004/0172454 A1* | 9/2004 | Appelman et al. | 709/206 |
| 2006/0116142 A1* | 6/2006 | Cofta | 455/466 |
| 2006/0123053 A1* | 6/2006 | Scannell, Jr. | 707/104.1 |
| 2006/0161457 A1* | 7/2006 | Rapaport et al. | 705/2 |
| 2006/0224430 A1* | 10/2006 | Butt | 705/8 |
| 2006/0248183 A1* | 11/2006 | Barton | 709/224 |
| 2007/0033091 A1* | 2/2007 | Ravikumar et al. | 705/9 |
| 2007/0087791 A1* | 4/2007 | Feeney et al. | 455/567 |
| 2007/0150583 A1* | 6/2007 | Asthana et al. | 709/224 |
| 2007/0220097 A1* | 9/2007 | Silver et al. | 709/206 |
| 2007/0220169 A1* | 9/2007 | Silver et al. | 709/246 |
| 2007/0285504 A1* | 12/2007 | Hesse | 348/14.08 |
| 2008/0033957 A1* | 2/2008 | Forstall et al. | 707/9 |
| 2008/0126943 A1* | 5/2008 | Parasnis et al. | 715/730 |
| 2008/0299960 A1* | 12/2008 | Lockhart et al. | 455/418 |
| 2008/0301190 A1* | 12/2008 | Lockhart et al. | 707/104.1 |

* cited by examiner

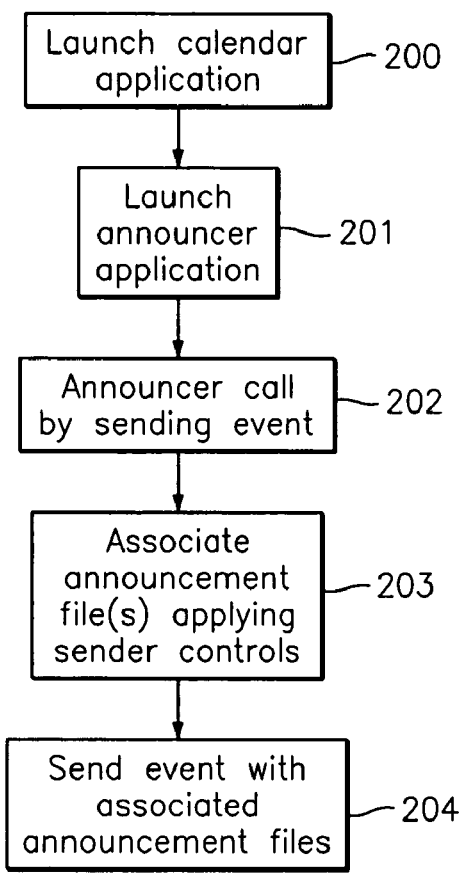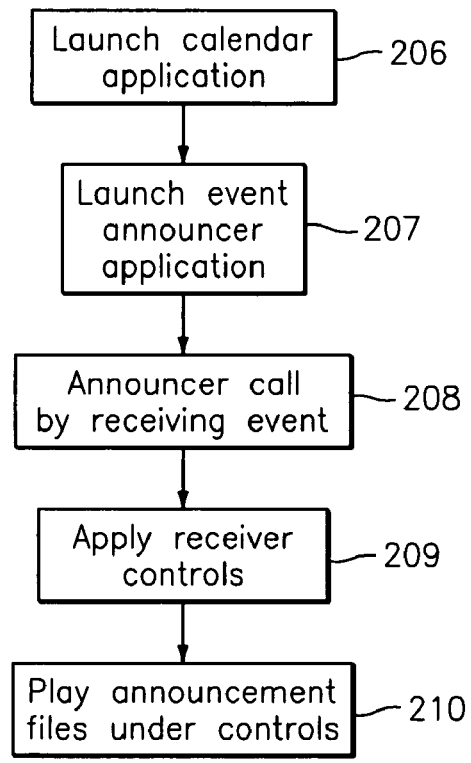
FIG. 4A
FIG. 4B

SYSTEMS, METHODS AND COMPUTER PROGRAM PRODUCTS FOR USER-SELECTED CALENDAR AND TASK ALERTS

BACKGROUND

The present invention relates generally to the electronic transfer of information, and more particularly, to systems, methods and computer program products for user-selected calendar and task announcements.

Improvements to computer processing power and computer operating systems (e.g., Microsoft Windows) have led to the capability of personal computer users being able to keep more than one application program open at the same time. With the advent of high-speed Internet service, one of the applications that many persons find helpful to continue running while busy at other tasks on their desktops is their calendar application program. In some applications, when a meeting invitation arrives as an email, a "ping" tone is often heard to inform the user that a new message has arrived, but then the user must bring their email application up to determine the originator of the message, the subject matter, the import, and other attributes of the message. Not until the recipient has read the event or opened his email "in box" and examined the event does he know whether it was a wise decision to interrupt his other work for this message. Further, as multiple event messages come in throughout the day, it becomes inefficient to drop a task to examine the import of each event. Similarly, when a calendar and/or task event ("event") become "due" or active, a "ping" tone can be heard, which alerts the user that the event has become "due" or active. Alternatively, several applications offer "pop-up" windows when an event or task becomes due. In all cases, the user must visually refer to the pop up text or the event/meeting/task text to discern the nature of the reminder. In addition, calendar applications can be shared in which several users on a network can be linked to a common calendar application and users can have distributed access to the tasks and events associated with the calendar application.

Techniques have been proposed for allowing a user to associate a particular audio file with a particular entry/person in an address book, which can be similarly linked to the broadcast of an event to another user or a group associated with the event or task. Thus, distinctive audio files may be used to inform the user of the presence of a new event and to indicate the nature and/or urgency of the event.

While this technique may be extremely useful in practice, recipient associated announcements are dictated from the recipient's point of view (e.g., a message from a particular source is always urgent). They may be general in nature and do not take into account the changing environment and situations facing senders.

The sender on the other hand has the timely knowledge of the many circumstances, content, context, necessity and urgency associated with an event and associated action and many other attributes of the events that might be conveyed with an event announcement. Thus, there is a need to take advantage of the sender's real time knowledge of the circumstances surrounding the composition of an event and the sender's ability to gauge the effect of a particular announcement on the recipient.

SUMMARY

Exemplary embodiments include a method for distributing and managing electronic information between a sender and a recipient, the method including creating at least one of an event and a schedule of events on an application on a sender terminal, identifying at least one of a user and a group of users associated with said schedule of events, at least one of the users and each member of the group of users having a recipient terminal, identifying an announcement that uniquely associates a subset of said schedule of events with a subset of said group of users, associating at least one announcement file with an electronic message for events, the announcement file configured for playing at a recipient terminal upon occurrence of at least one of the event and the schedule of events and broadcasting said schedule of events over a network to said group of users, said subset of users additionally receiving said announcement file associated with said subset of said schedule of events.

Additional embodiments include a system for sharing electronic information among a group on a network, the system including a sender terminal having an application linked to the group and for creating a schedule of events that is available to the group, an associated announcement file library including a plurality of announcement files and a matrix of announcement associations associating at least one announcement file with a subset of said schedule of events and an association function matching said subset of said schedule of events with the announcement associations to associate at least one announcement file with said subset of said schedule of events.

Further embodiments include a computer program product for providing shared calendar events over a network coupled to a plurality of computers, the computer program product including instructions for implementing a method, including creating a calendar event, identifying at least one user of the plurality of computers who have an interest in said event, thereby identifying said event as a shared calendar event, associating said at least one user with a group having the ability to receive said shared calendar event, associating a multimedia announcement file with said shared calendar event, distributing said event to said group and executing said multimedia file when said shared calendar event occurs.

Further embodiments include a method in a system having a shared calendar application for distributing calendar and task events over a network among a plurality of computers, the method including creating an event using the shared calendar application, identifying users of the plurality of computers who have an interest in said event, associating said users with a group, associating a multimedia announcement file that is executable concurrently with said event when said event occurs for said group and distributing said event to said group.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

These and other features, aspects, and advantages of the present invention will become better understood when the following detailed description is read with reference to the accompanying figures, wherein:

FIG. 4A is a flow diagram of a sender calendar/task alert application;

FIG. 4B is a flow diagram of a receiver calendar/task alert application;

DETAILED DESCRIPTION

Figure 1:
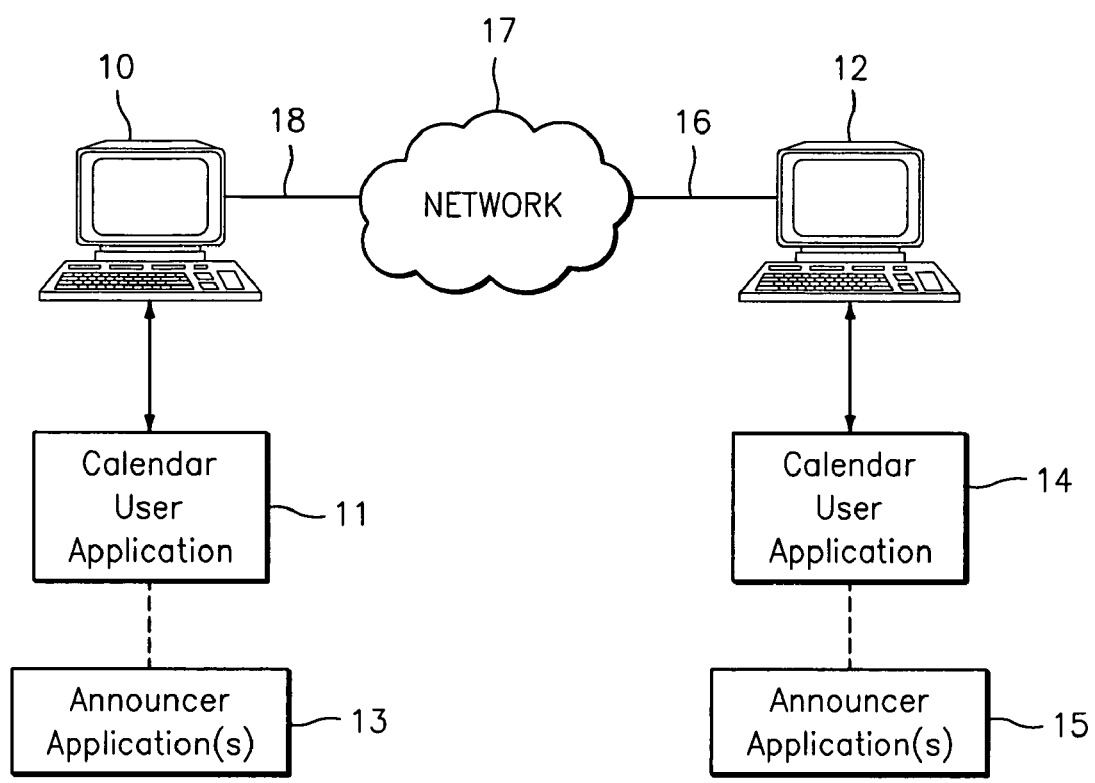
FIG. 1 is a schematic diagram of one implementation of a computer network system in exemplary embodiments.

Embodiments include a method for electronic information transfer by a sender. The method includes composing an electronic message, usually in the form of a calendar-related invite or task, on a sender terminal. At least one announcement file is associated with an attribute of the electronic message, the announcement file configured for playing at a recipient terminal upon the recipient terminal receiving the electronic message. The electronic message and the association to the announcement file are sent over a network to a recipient at the recipient terminal. Embodiments include a computer program product for implementing the method.

Embodiments include a system for electronic information transfer by a sender. The system includes an event application for composing an electronic message on a sender terminal. In exemplary implementations, the electronic information is recipient-controlled. In other exemplary implementations, the recipient can change or override the announcement, can append the announcement to a calendar item, which can be from a variety of sources for existing announcements (e.g., stored as a .wav file, a link to an external source, etc.) An associated announcement file library includes a plurality of announcement files and a matrix of announcement associations associating at least one announcement file with an attribute of the electronic message. The announcement file is configured for playing at a recipient terminal upon the recipient terminal receiving the electronic message. An association function matches attributes of the electronic message with the announcement associations to associate at least one announcement file with the electronic message.

In general, the term "electronic message" refers to any user or sender-generated activity that results in a calendar- or task-related event alert being generated on the end user's view. Examples include, but are not limited to: meeting or appointment reminders; task status reminders; due date reminders; overdue alerts, etc. It is appreciated that the systems and methods described herein disclose a computer as the device that includes the calendar applications. It is appreciated that computers are described for illustrative purposes and that any type of network-enabled device capable of implementing calendar applications where any calendar/task event alerts can be propagated is contemplated. It is further contemplated that the devices can share and be synced with a common calendar and are capable of playing the alert. In exemplary embodiments, the device can be a personal computer, a laptop computer, a portable computing device (e.g., personal digital assistant), a cellular telephone, etc.

The exemplary embodiments described herein generally refer to a user in the context of a sender's recipient. It is appreciated that, in general, a user can be a sole user and apply settings to his/her own calendar. As such, a user can generate user-designated calendar-driven reminder presentations so that the user can set the announcement files to play based on calendar-linked notifications for appointment reminder, task due dates, etc. The user can also be a recipient, as mentioned, in which a sender, such as a meeting organizer, designates the alerts. The end user can exert control over the notifications including whether to accept or override sender calendar-linked notifications and designations, override them to not play at all, retain the user's designations, etc. Furthermore, an administrator can manage user privileges in which rules can be made determining, among other things, who can override, who can override who and for which event types, etc.

Exemplary embodiments are now described in more detail with reference to the figures. FIG. 1 is a schematic diagram of a computer network system 8 in exemplary embodiments. According to an exemplary embodiment, the system 8 includes at least one computer terminal 10 connected through a network link 18 and a communications network 17 to another computer terminal 12 via another network link 16. Each computer terminal 10, 12 may have a software operating system that runs a number of application programs. The software, including the operating system and the application programs, are stored in the memories of the terminals 10 and 12. Typical application programs would be for word processing, audio and video editing, spread sheets, graphics, and multimedia presentations, etc. A user controls the computer terminals 10, 12 through a user interface, today usually a graphic interface, which he communicates with via a keyboard, mouse or other input device. The term computer terminal in this description is not limited to any specific type of terminal and may include computer systems having many computers, or only a portion of a computer (e.g., thin client), and the associated peripheral devices as are necessary for the operation of the invention. Further, the computer terminals may represent any device that is capable of sending and/or receiving and event such as a PDA, wireless phone, wireless event device, etc.

The network 17 may be in the form of a wired network or a wireless network. The network 17 may be a simple, single communications path, or it may include one or several LANs or WANs, the World Wide Web, or any combination thereof. The computer terminals 10 and 12 may be the only two terminals connected to the network 17, or alternatively, the network may be shared by many other terminals.

Embodiments are described herein with reference to associating an announcement file with an application capable of generating event and tasks as well as related reminders. For example, a calendar application that is capable of generating events and tasks and reminders related to those events and tasks can have an announcement file associated with the reminders of those events and tasks. It is understood that announcement files may be associated with other types of electronic messages, such as text messaging. Thus, embodiments are not limited to the aforementioned applications, but rather electronic messaging in general. It is also understood that such applications can not only be shared applications as described herein, but also for single user use, in which, for example, a calendar can generate a reminder that executes an announcement file concurrently for the non-networked user.

One of the applications programs the user of computer terminal 10 may call for execution by the operating system is a calendar application program 11. The calendar application program 11 allows the user to generally schedule events either for personal non-networked use, but also for networked use, such as a shared calendar for a group. Such a shared calendar can be distributed over the network 17 to the other computer terminal 12. The calendar application program 11 also receives and displays on the display of terminal 10 shared calendar events and tasks received from the terminal 12. Similarly, the computer terminal 12 has a calendar application program 14 that is capable of allowing a user to generally schedule events either for personal non-networked use, but also for networked use, such as a shared calendar for a group to terminal 10 and to receive and display similar messages from terminal 10. One existing implementation of the application programs 11, 14 is a program sold under the trademark Outlook by the Microsoft Corporation of Bellview, Wash. As is evident there many other suitable commercially available calendar application programs which could be used. It is generally appreciated that the calendar applications described are capable not only of generating schedules, events, tasks and the like, but also reminders associated with those schedules, events, tasks, and the like. Therefore, the aforementioned terms are used together and interchangeably herein.

Working in concert with each calendar application program 11, 14 is a corresponding calendar/task alert application program 13, 15, respectively. The calendar/task alert application program, for example calendar/task alert application program 13, supports a process for associating announcement files by a sender with schedules the user has generated with the calendar application program 11 and further provides for receiving schedules and playing announcement files sent from the computer terminal 12. Calendar/task alert application program 15 supports a process for associating announcement files by a sender with schedules that the user has generated on the calendar application program 14 and further provides for receiving calendar information and playing announcement files sent from the terminal 10. As fully explained herein, calendar/task alert application programs 13, 15 may be integrated into calendar application programs 11, 14 or be separate programs enhancing the functionality of the calendar communications.

Usually, as part of the calendar application program 11 and as part of the terminal 10, there is a communications interface connected to the network 17 that permits it to send and receive communications over the network 17. Similarly, as part of the calendar application program 14 and as part of the terminal 12, there is a communications interface connected to the network 17 that permits it to send and receive communications over the network 17. For the purposes of this specification, the convention is used that a sender of an event is a user of either terminal 10, terminal 12, or other similar terminal, who composes and sends an electronic communication over the network 17 with or without one or more associated announcement files, and a recipient is a user of either terminal 10, terminal 12, or other similar terminal, who receives and displays an electronic communication with or without one or more associated announcement files from the network 17.

Figure 2:
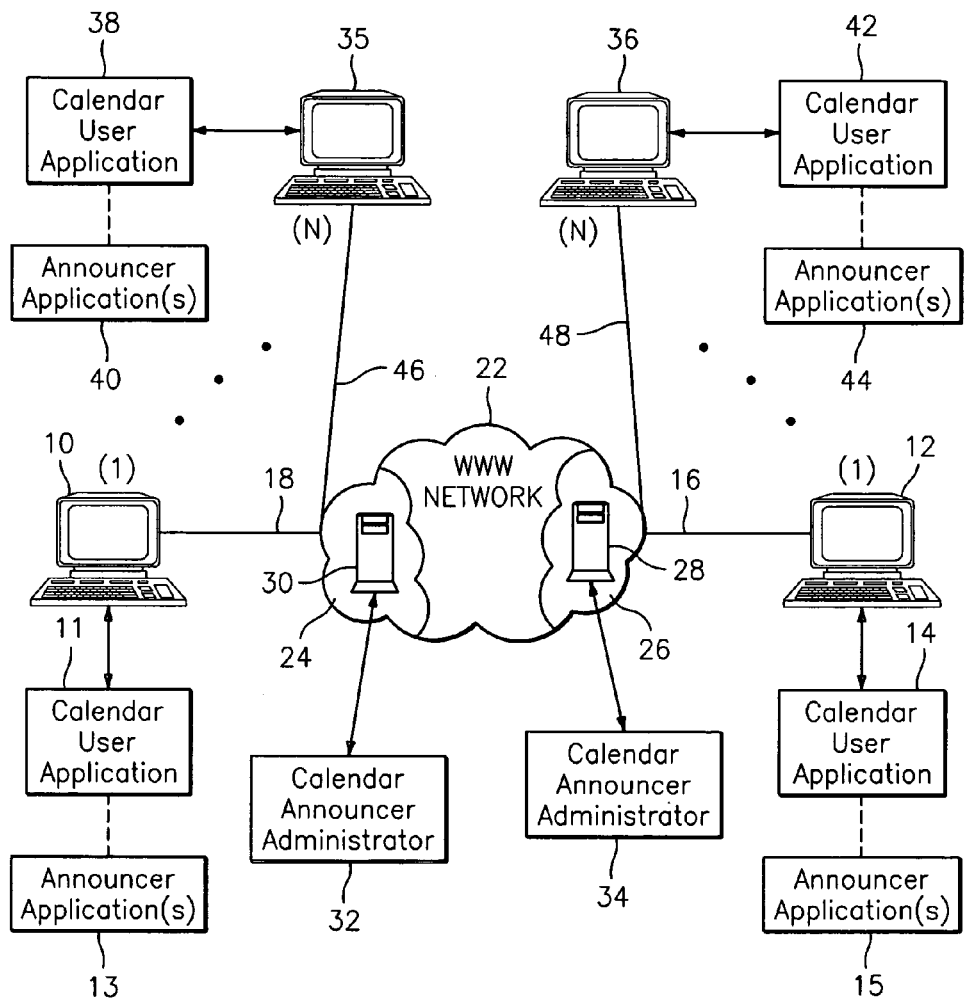
FIG. 2 is a schematic diagram of a second implementation of a computer network system utilizing the world wide web exemplary embodiments.

Regarding FIG. 2, there is shown a computer network system 20 constructed in accordance with the exemplary embodiments. According to an exemplary embodiment, the computer network system 20 utilizes a network, such as the World Wide Web (internet) 22, for connection to intranets 24 and 26 that each couple to a plurality of computer terminals 1 . . . N. Each computer terminal 10, 35 of the intranet 24 optionally includes a calendar application program and an calendar/task alert application program, programs 11, 13 for terminal 10 and programs 38, 40 for terminal 35, respectively. Similarly, each computer terminal 12, 36 of the intranet 26 optionally includes a calendar application program and an calendar/task alert application program, programs 14, 15 for terminal 12 and programs 42, 44 for terminal 36, respectively. Further, each terminal 10, 35 is coupled for intranet communications by links 18, 46 to a server 30 and the server 30 is coupled for Internet communications via network 22 to a server 28. Likewise, each terminal 12, 36 is coupled for intranet communications by links 16, 48 to the server 28 and the server 28 is coupled for Internet communications via network 22 to the server 30. In this manner, each terminal, e.g. terminal 10 can compose and send events, calendar information and other electronic communications and associated announcement files to any of the terminals on its intranet 24 or any other terminal coupled to the network 22. Similarly, each terminal, e.g. terminal 12 may receive electronic communications and other messages and associated announcement files from any of the terminals on its intranet 26 or any other terminal coupled to the network 22. Each server 28, 30, in addition to its control and routing functions may optionally include a calendar/task alert administrator programs 32, 34 respectively. As more fully explained herein, calendar/task alert administrator programs 32, 34 allow announcement files associated with sent events to be identified, controlled and filtered before being routed to other terminals in an intranet or other terminals over the Internet. The calendar/task alert administrator programs 32, 34 also allow announcement files associated with received events to be identified, controlled and filtered before being routed.

Figure 3:
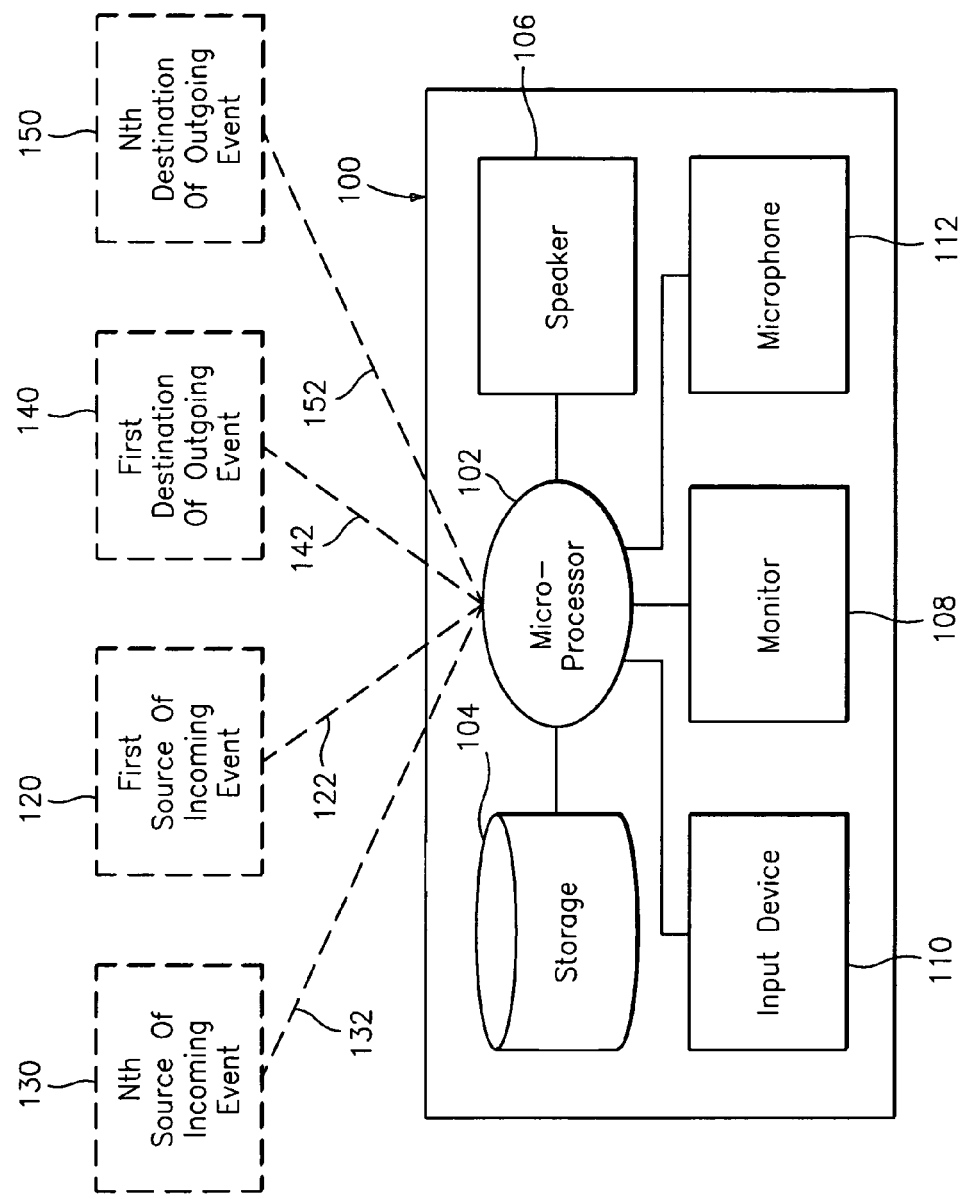
FIG. 3 is an exemplary block diagram of an implementation of one of the computer terminals illustrated in FIGS. 1 and 2.

FIG. 3 shows an exemplary architecture of one or more of the computer terminals illustrated in FIGS. 1 and 2. According to an exemplary embodiment, each computer terminal 100 includes a microprocessor 102, storage or memory device 104, a speaker 106, a display monitor 108, an interface or input device 110 and a microphone 112. As those skilled in the art appreciate, the terminal 100 can be a personal computer system such as a laptop computer, desktop computer, or the like. According to exemplary embodiments, the terminal 100 may be adapted to run an operating system that can control multiple programs at once, such as Microsoft Windows, or the like, and to run at least one calendar application program, such as Microsoft Outlook, or the like.

As those skilled in the art also appreciate, microprocessor 102 executes programs retrieved from storage device 104 upon commands received from the input device 110. The storage device 104 contains the operating system, calendar application program 11, calendar/task alert application program 13, audio, video, and text files, as well as other application programs and media players necessary to play audio, video, and text files. Storage device 104 can be any device that can store data including a hard drive, tape drive, flash memory, or the like. The audio files can be .wav files or other audio files that can be reproduced on speaker 106 by the microprocessor 102. Similarly, the video files can be .mpeg or other video files that can be reproduced on the display monitor 108 by the microprocessor 102. The text files can be word files or other text files that can be converted to audio files and reproduced on speaker 106 or displayed as text on monitor 108 by the microprocessor 102. Speaker 106, display device 108, input device 110 and microphone 112 are typical elements of personal computer systems and well known in the art. Input device 110 can be one or both of a keyboard and a pointing device. The pointing devices can be, for example, a mouse, a track point, a joystick, or the like.

The terminal 100 may send events with associated announcement files to a first destination 140 and to any Nth destination 150 via the microprocessor connections 142 and 152 coupled to any of the communications links, for example link 18 in FIGS. 1 and 2. Likewise, the terminal 100 may receive events with associated announcement files from a first source 120 and an Nth source 130 via microprocessor connections 122 and 132 coupled to any of the communications links, for example link 18 in FIGS. 1 and 2.

It is appreciated that the same computer can originate its own incoming event in addition to the situation in which all incoming events are originated from a source external to the computer.

FIG. 4A is a flow chart of execution of the calendar/task alert application program 13 at the sender terminal 10. The process begins with terminal 10 launching the calendar application program 11 for the user in step 200. In this example, the terminal 10 uses Microsoft Outlook as an implementation of the calendar application program 11. At step 201, the sender calendar/task alert application program 13 is launched, which enables the user to send events with associated announcement files.

Those skilled in the art appreciate that there are several ways to launch the calendar/task alert application program 13. The calendar/task alert application program may be a plug in or complementary program to the calendar application program 11 that both are running together. Alternatively, if the calendar/task alert application program 13 is an integrated component of the calendar application program 11, the user simply launches the calendar application program thereby causing the calendar/task alert application program 13 to initiate running. Another alternative is that every time the terminal 10 is reset or turned on and the operating system is launched, it automatically launches the announcement application program 13 or a calendar application program 11 that contains the announcement application program.

When a user elects to send an event, such as a schedules of events associated with a particular group, a calendar/task alert call is generated at step 202. As described in further detail herein, the calendar/task alert application program inspects attributes of an event and associates an announcement file with the event at step 203. Controls are applied by the calendar/task alert application to determine which announcement files are to be associated with the event. A step 204, the event and the associated announcement file(s) (if not blocked by certain controls) are sent to the receiver.

It is appreciated that the flow chart described above applies to situations in which an end user sets events for him/herself and in which a user has receipt of and interaction with a sender-initiated event.

FIG. 4B is a flow chart of execution of the calendar/task alert application program 15 at the receiver terminal 12. The process begins with terminal 12 launching the calendar application program 14 for the user in step 206. In this example, the terminal 12 uses Microsoft Outlook as an implementation of the calendar application program 14. At step 207, the receiver calendar/task alert application program 15 is launched which enables the user to receive events with associated announcement files.

It is evident to those skilled in the art that there are several ways to launch the calendar/task alert application program 15. The calendar/task alert application program may be a plug in or complementary program to the calendar application program 14 that both are running together. Alternatively, if the calendar/task alert application program 15 is an integrated component of the calendar application program 14, the user simply launches the calendar application program thereby causing the calendar/task alert application program 15 to initiate running. Another alternative is that every time the terminal 12 is reset or turned on and the operating system is launched, it automatically launches the announcement application program 15 or a calendar application program 14 that contains the announcement application program.

When an event is received at receiver terminal 12, the calendar/task alert application is called at step 208. The calendar/task alert application inspects attributes of the received event and announcement files (if any). At step 209, the calendar/task alert application applies controls to determine whether the announcement file associated by the sender should be played, or an alternate announcement file played. The controls applied at the receiver terminal are described in further detail herein. At step 210, announcement files are played indicating to the recipient that an event has arrived. The announcement files may include text, audio, video, pictures, and combinations thereof. The term "play" as used herein refers to presenting the contents of the announcement file in a human recognizable form (e.g., displaying text or pictures, generating audible tones). It is appreciated that in another implementation, it is possible that an associated announcement file is not attached or otherwise associated with an event. For example, a user on sender terminal 10 may have set up several different groups using calendar application program 11. As such, if a particular group has a particular interest, then the associated announcement file can be attached. However, if a particular group does not have an interest in the event, then the user can have the option to associate no announcement file with the event.

Figure 5:
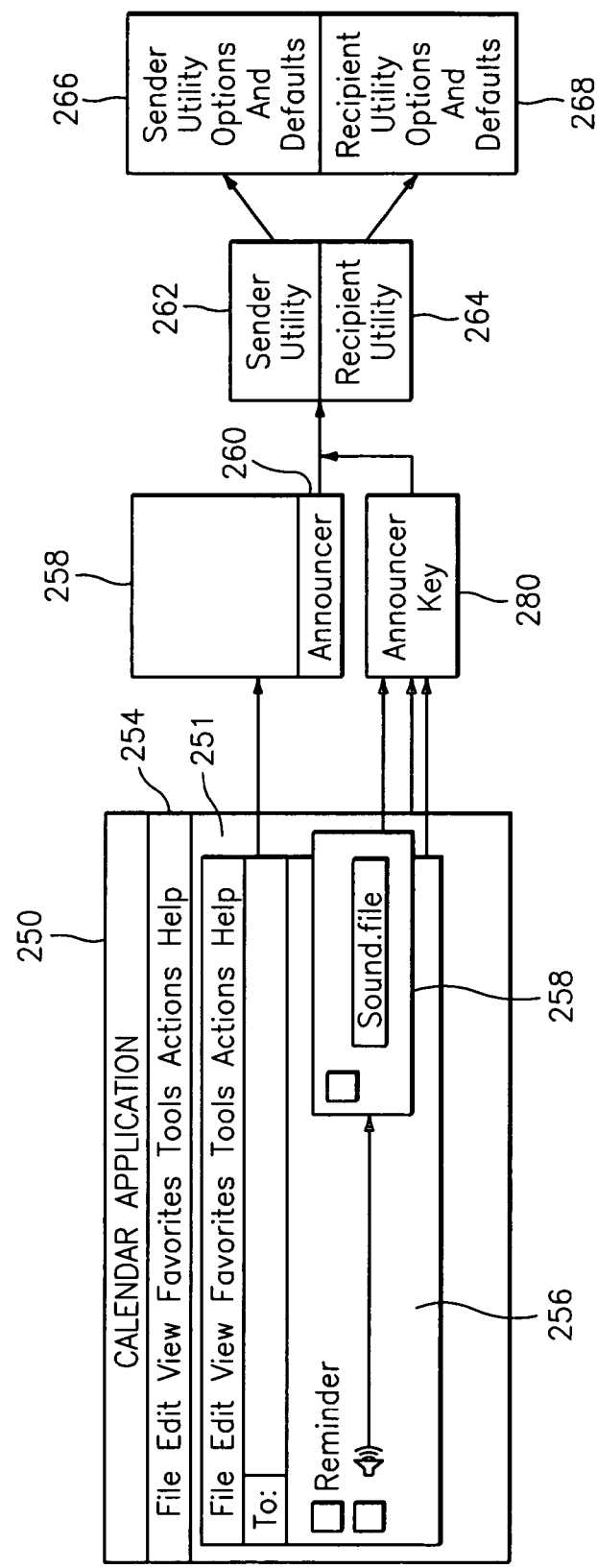
FIG. 5 is a pictorial representation of the interactive interfaces for the calendar application program, the sender calendar/task alert application program and recipient calendar/task alert program of the terminal illustrated in FIGS. 1 and 2.

While the calendar application program 11 and the calendar/task alert application program 13 are concurrently running, it is desirable to be able to communicate between the two to facilitate the use of the calendar/task alert function of the system 8. FIG. 5 shows one example of integrating the calendar/task alert function into the calendar application program 11 with a plurality of interactive graphic interface screens that allow the user to control both programs seamlessly. User interface 250 is a typical main screen for a calendar application program 11 where events and other schedule information can be viewed in window 251. User interface 250 also contains a tool bar 254 from which control selections, defaults and user preferences may be performed. One user option is a create event window 256 which the user selects by clicking on the term tools with the input device 110 in the tool bar 254 or alternatively by clicking on a calendar location on window 251.

Another submenu of applications for the event window 256 is an announcement window 258 to which a selection for the calendar/task alert function 260 has been attached. Selection of the calendar/task alert function 260 by the user renders the choice of either the sender calendar/task alert utility 262 or the recipient calendar/task alert utility 264. Selection of the sender utility choice 262 sends the user to another interactive menu of the sender utility 266 where the options and default selections of the sender calendar/task alert application program can be made. The alternative choice 264 of the recipient utility sends the user to the interactive menu of the recipient utility 268 where the options and default selections of the recipient calendar/task alert application program can be made. These interactive graphics menus allow the user to start his calendar application program 11 and then set the options and defaults for the calendar calendar/task alert application 13 advantageously before calling other programs to run on top of his desktop.

According to an exemplary embodiment, if the user wishes to compose an event with calendar application program 11, he can select to create a new event to open window 256 into which the event information can be added, including the entry of recipients and the text of the event. Once the user has filled in the body of the calendar event, the user can then transmit the event. Prior to sending the event, if the user wishes to associate an announcement with an outgoing event, to check on a former association, or modify, alter or delete a former associated announcement file, he can use a preselected calendar/task alert key combination 280, referred to herein as a hot key, on his input device 110 to transfer control to the calendar/task alert utility functions 266, 288. In the example, this ability allows him to select the sender utility 266 and select, change or modify the announcement file associations. Optionally, the user may also enter the calendar/task alert utilities 266, 268 through the calendar/task alert key 280 from the screen 250. In one implementation, the user can open the announcement window and have the option to choose a sound file to include with the event.

Figure 6:
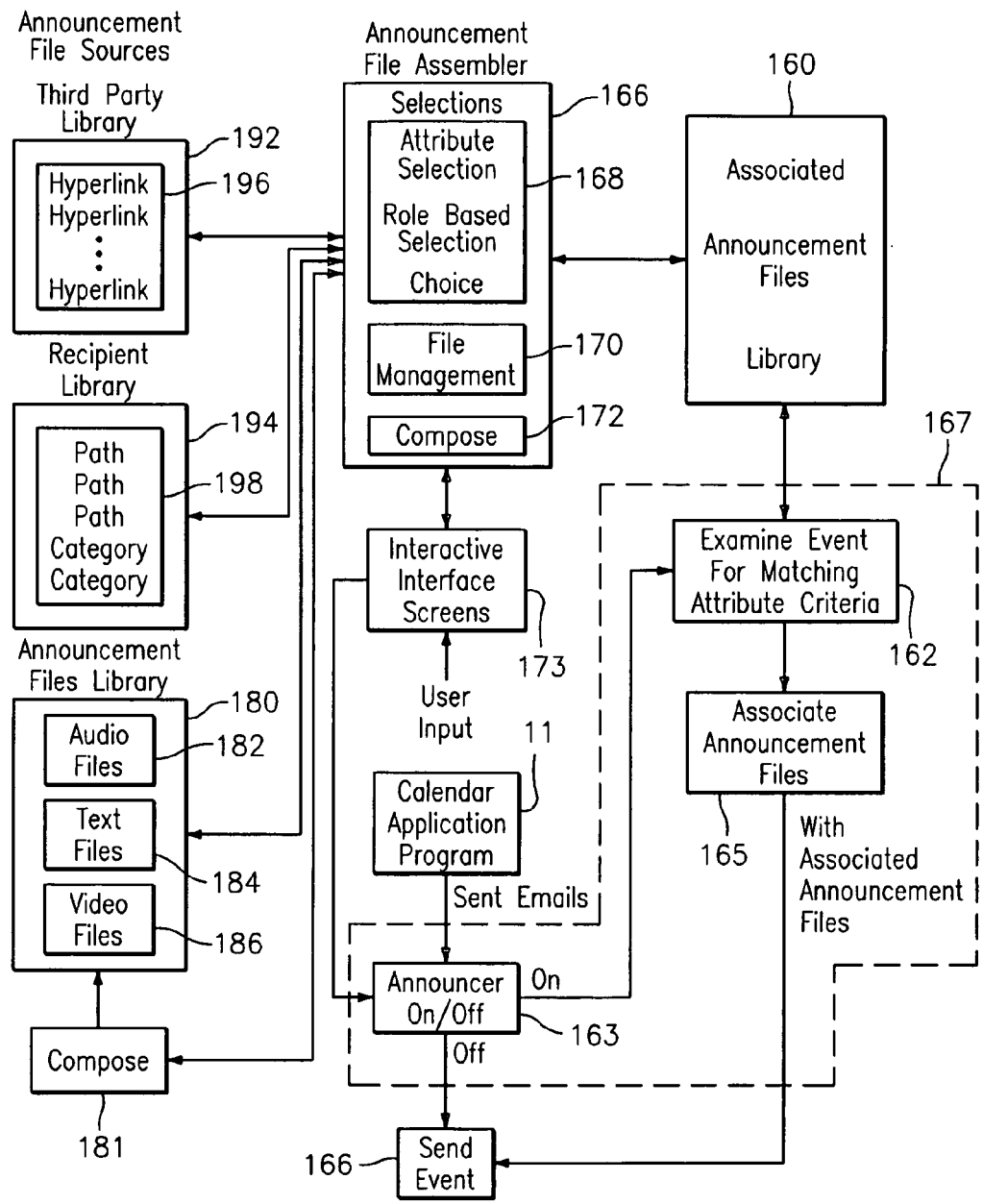
FIG. 6 is a functional block diagram of the sender calendar/task alert application program called in the flow diagram of FIG. 4.

With respect now to FIG. 6, a functional block diagram of embodiments of a sender calendar/task alert application program are more fully described. The purpose of the sender calendar/task alert application program is to provide a flexible and advantageous process for associating one or more announcement files with one or more attributes of one or more events. The association allows the announcement file when played by a recipient to announce the attribute to the recipient without having to read the entire event at the particular time and without bringing the calendar application to the upper window of the desktop while using a Windows type operating system. To implement this purpose, the sender application program assembles an associated announcement file library 160 that includes a matrix of associations. The associations are generally made according to a defining attribute, such as a sender address, message urgency, subject line contents, and a definition for desired matching criteria, for example, a message labeled with a "high" urgency, to as a "specific" sender address for a "specific" subject. To complete the association, an announcement file, such as an audio file of a siren, is associated therewith by the sender. Therefore, it is appreciated that different rule sets can be established to determine when an announcement file is to be included and "pushed" through with the event. Rules can also include whether or not to automatically delete the associated announcement file so that unnecessary storage space is not used up after the announcement file has been played.

The announcement files may be obtained or purchased by individual senders of event. For example, a sender may be a fan of the television program The Simpsons, and download a set of audio and/or video files to be added to the associated announcement file library 160. These announcement files may be downloaded from a website offering the announcement files. The announcement files may be purchased (if the value is significant enough to the users) or may be freely distributed. Free distribution of announcement files may be used to promote goods or services. For example, Warner Brothers may wish to promote the latest Harry Potter movie by freely distributing event announcement files having themes consistent with the movie. It is therefore appreciated that events can be associated with a link to external web locations in order to link the event with an announcement on another location on the web.

With the associated announcement files library 160 assembled, a user composes events in a with the calendar application program 11 and when finished selects the send button when the event is completed. An event association function 167 detects the send selection of the calendar application program 11 and determines whether the user has turned the calendar/task alert function on in calendar/task alert control routine 163. The calendar/task alert control routine 163 permits the user to turn the calendar/task alert function on or off, thereby giving him the flexibility to either associate an calendar/task alert file with the outgoing event or not. Further, the user may turn the calendar/task alert control on for only one event or leave it on for all events that he wants to be announced. If the calendar/task alert function is turned off in the calendar/task alert control routine 163, then the event returns to the normal send event routine 166 of the calendar application program 11 and be communicated over the network 17. If the calendar/task alert control routine 163 has the calendar/task alert function turned on, then the event is examined as to its attributes that are stored in the announcements files library 160 by matching routine 162. Each listed attribute in the library 160 is tested to determine if there is a matching criterion in the event. If there are one or more matching attribute criteria, then the association function 167 associates the announcement file(s) linked to those attributes and matching criteria in association routine 165. After the association of the announcement files with a particular event, the event returns to the normal send event routine 166 of the calendar application program 11 and be communicated over the network 17.

Figure 7:
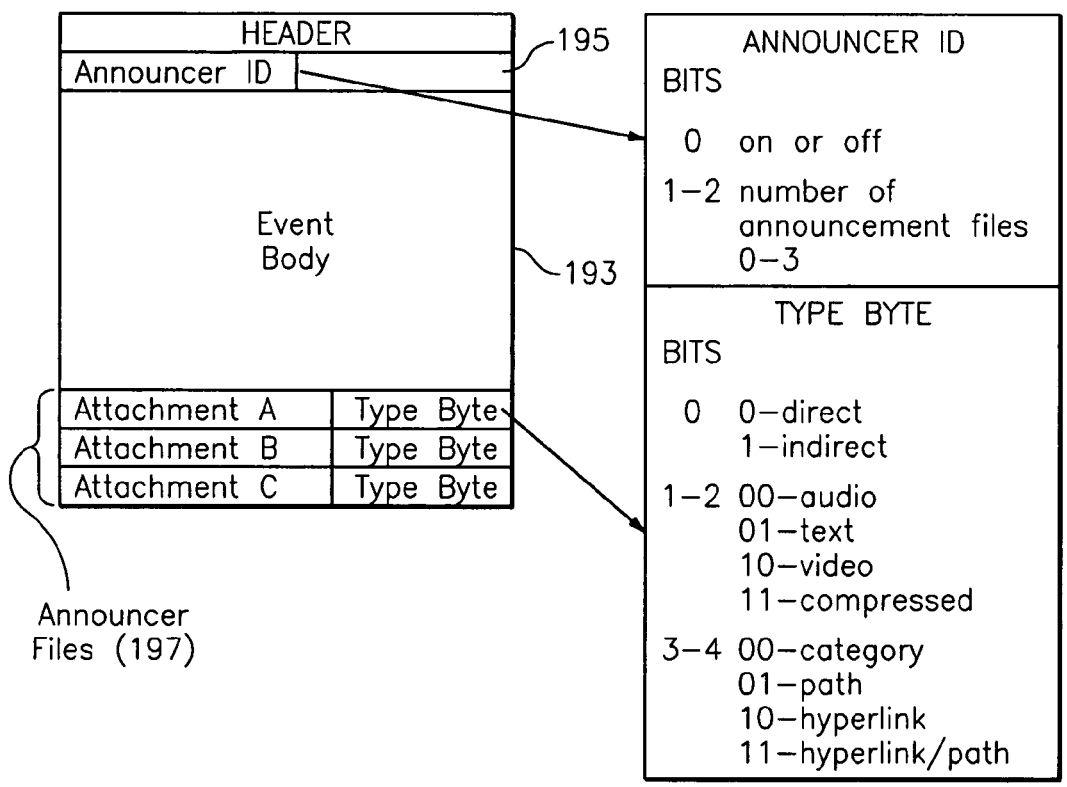
FIG. 7 is a pictorial representation of an event with associated announcement files.

With reference to FIG. 7, to associate the announcement files with an event, the association routine 165 in embodiments writes a calendar/task alert ID in the header 195 of an event 193. The calendar/task alert ID is a multi-bit identifier that tells the event recipient application program 13 whether or not an announcement file has been associated with the event 193 or not. A set bit in the first position of the identifier, bit 0, is used to indicate that announcement files are associated with the event and a cleared bit in bit 0 to indicate there are no announcement files associated with the event. Next in the calendar/task alert identifier, two bits indicate the number of announcement files associated with the event 193 from 1-4. The event body follows the header 195 that contains, in addition to the calendar/task alert ID, all of the normal header information, such as sender, recipient, source address, destination address, subject line, etc. The associated announcement files 197 in embodiments are associated as attachments in a conventional manner. Each announcement file 197 begins with a byte of information indicating in the first bit, bit 0, whether the following file is the actual announcement file (direct) or an address or path to an announcement file (indirect). The next two bits, bits 1-2, indicate the types of file to be announced (whether direct or indirect) and include audio, text or video files and an indication whether such files are compressed. The next two bits, bits 3-4, indicate the types of indirect paths to the announcement file(s) 197 and include a category path, local path, hyperlink, or hyperlink with path.

Returning now to FIG. 6, embodiments of the sender calendar/task alert application program also provide an announcement file assembler 166 that under the commands of the user from interactive interface screens 173 builds the associated announcement files for the library 160 from several sources. The announcement file assembler 166 builds the associated announcement files library 160 from sources including an announcement files library 180 stored on the sender terminal, announcement files 194 stored on the terminal of the recipient, and announcement files 194 stored on the computer terminal of a third party.

The announcement files library 180 stored on the terminal of the sender can comprise audio files 182, text files 184 and video files 186. Other sources of announcement files are not sent to the recipient as actual announcement files but are instead associated as their address (indirect). If the announcements files 198 are located on the terminal of the recipient, then either a path, such as c:/program files/announcement/wave/siren.wav, is sent to allow the recipient terminal to find the announcement file or a category indicator such as happy, sad, emergency, impatience, etc. is sent with the knowledge that the recipient has associated their own choice of announcement file with that category indicator. For third party announcement files, the web address (hyperlink) of the announcement file that the sender wishes to associate is sent as the announcement file. The hyperlink may also direct the recipient to a codec needed to play an announcement file. The web address of a third party announcement file may be sent either alone or in combination with a path link.

The announcement file assembler 166 comprises several optional processes that a user may choose from to assemble an announcement file association for the library 160 from the announcement file library 180 of the sender or the other sources of announcement files 192 and 194. As one option, a selection of primary attributes is provided in selections routine 168 where important attributes such as the urgency of the event, the sender address, the recipient address, the emotional category, the event length, etc. can be selected by an interactive interface and one or more announcement files associated with that attribute through that interface. As a second association option in selections routine 168, the announcement file association can be made according to a rule set selection that the user may establish. The third option in selections routine 168 is a pure choice selection, an association process that allows spontaneous associations at the time of composing the event from any announcement file from any source.

Another option provided by the announcement file assembler 166 is a file management process 170 that permits the announcement files in the associated announcement files library 160 to be changed, for example by adding to the association, deleting information from the association or modifying the association in some other way. Similarly, the file management process 170 permits the announcement files 182, 184, 186, 196 and 198 in the libraries 180, 192 and 194 to be changed, for example by adding files or addresses, deleting files or addresses, or modifying the files or addresses in some other way.

In addition, the announcement file assembler 166 optionally includes a compose selection 172 for the user. The choice by the user of the compose selection 172, which calls a compose function routine 181, allows the user a process to compose his own announcement files for the library 180. He may compose either an audio file to add to announcement file 182, a text file to add to announcement files 184, or a video file to add to announcement files 186.

Figure 8:
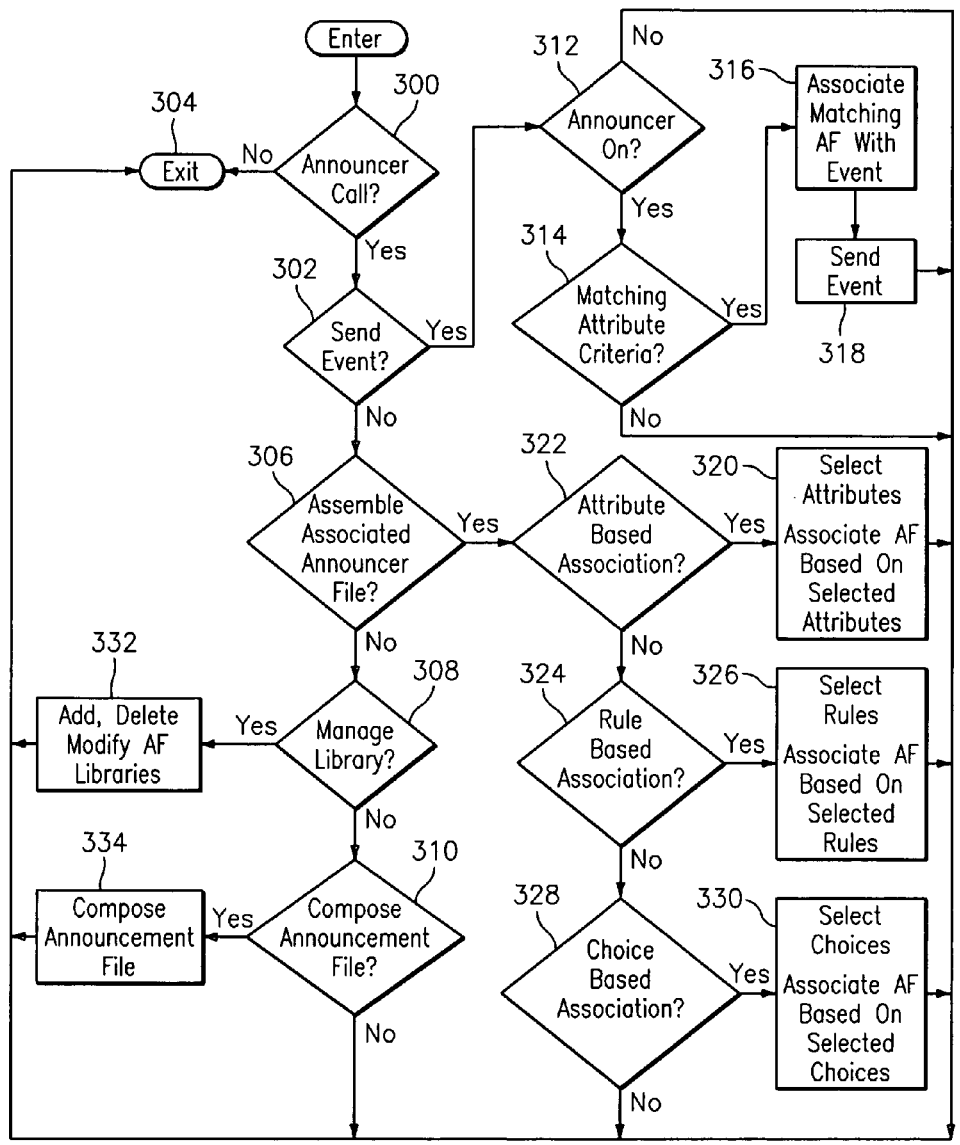
FIG. 8 is a flow diagram of the sender calendar/task alert application program of the block diagram in FIG. 6.

A flow chart for the sender calendar/task alert application program is now discussed with reference to FIG. 8. The sender calendar/task alert application program is entered in step 300 when an calendar/task alert call has been detected, either by the user calling the sender utility by the methods described in FIG. 5 and choosing an option for the announce file assembler 166 or by the user hitting a send button in window 256 in FIG. 5 to send an event, by the program step 206 in FIG. 4. In response to the transfer to step 300, the program checks to determine whether a valid calendar/task alert call has been made. If a calendar/task alert call has been made the program determines the source of the call in steps 302-310. Step 302 determines whether the calendar/task alert call was on account of the user wanting to send an event, while steps 306-310 determine whether there is a user selection of an option for announcement file assembler 166.

If the command is to send an event, then in step 312 the program determines whether the user has turned the calendar/task alert function on. If the calendar/task alert function is turned on, then in step 314 the association function routine 167 determines whether there is matching attribute criteria between the present event and those associated in the library 160. Those announcement files having matching criteria are then associated with the event in step 316 in the format described in FIG. 7 and the event is sent in step 318 by the calendar application program 11. Otherwise the program exits in step 304 for determinations that the calendar/task alert function is not on or that there are no matching attribute criteria between the event being sent and those stored in the library 160.

If the command is a selection for announcement file assembler 166, then in steps 306, 308 and 310 the program determines whether the user has elected the assemble associated calendar/task alert file function in step 306, the manage library function in step 308 or the compose function in step 310. If the decision in step 306 is affirmative, then the program tests which file assembly choice has been made in steps 322, 324, and 328. If the choice has been made to assemble an associated calendar/task alert file based on attributes in step 322, then in step 320 an interactive interface screen is displayed to assist the user in making his attribute and association selections. If the choice has been made to assemble an associated calendar/task alert file based on rules in step 324, then in step 326 an interactive interface screen is displayed to assist the user in making his rule and association selections. If the choice has been made to assemble an associated calendar/task alert file based on choice in step 328, then in step 330 an interactive interface screen is displayed to assist the user in making his choice and association selections. If the choice has been made to manage the library in step 308, then in step 322 an interactive screen is displayed to assist in the file management. If the choice has been made to compose an announcement file in step 310, then in step 334 the compose function 181 is called and interactive screen is displayed to assist in the composition of an announcement file.

Figure 9:
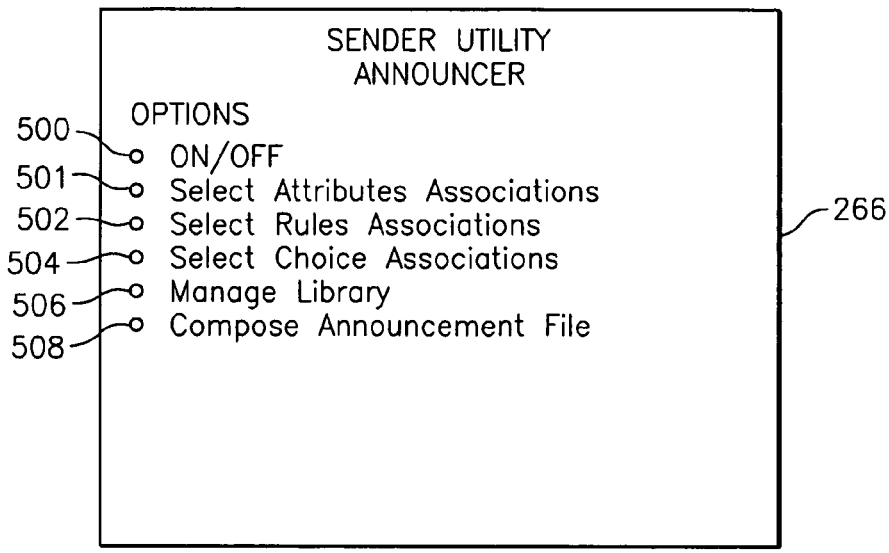
FIG. 9 is a pictorial representation of the interactive screen control for the sender calendar/task alert application program illustrated in FIG. 8.

FIG. 9 is a representative pictorial of the interactive screen 266 that is displayed when the utility program for the sender calendar/task alert application program is called in FIG. 5. This screen allows the user to command the sender calendar/ task alert program to display the selection screens for associating announcement files and provides defaults and other optional functions. The screen 266 provides a series of selection buttons 500-508 that can be selected by clicking on them with the cursor 110 of the terminal 100. The status of each button is then stored in the memory of the terminal 100 where the sender calendar/task alert application program can read that status and respond accordingly.

When the screen 266 is displayed, the user can turn the sender calendar/task alert function on or off by selecting the state of the button 500. When the button 500 is in the off state, the associated announcement files of library 160 are not associated with outgoing events. When the button 500 is in the on state, the association function matches attribute criteria and associates the announcement files with the outgoing events. If the user decides to associate announcement files with events, then he selects one of the select buttons 501, 502, or 504 for the manner of association. Selecting button 501 for attribute associations issues a calendar/task alert call and starts the sender calendar/task alert application program where step 320 of FIG. 8 is entered to implement the function. Selecting button 502 for rule associations issues a calendar/task alert call and starts the sender calendar/task alert application program where step 326 of FIG. 8 is entered to implement the function. Selecting button 504 for choice associations issues a calendar/task alert call and the start sender calendar/task alert application program where step 330 of FIG. 8 is entered to implement the function. Similarly, selecting button 504 to manage the libraries issues a calendar/task alert call and starts sender calendar/task alert application program where step 332 of FIG. 8 is entered to implement the function. Selecting button 504 to compose announcement files issues an calendar/task alert call and starts sender calendar/task alert application program where step 334 of FIG. 8 is entered to implement the function.

The sender calendar/task alert application program in embodiments of process step 320 provide the user with a convenient process and tool for selecting attributes of an event to associate with corresponding calendar/task alert files. As better illustrated in FIG. 11, an interactive interface association screen 600 is displayed to the user (sender) when the program transfers from step 320 in FIG. 8. In the association screen display 600, the terminal 100 graphically displays a list of selected attributes of an event in display boxes 610-650. The interactive display allows the user to navigate through the screen and make choices therein by way of his cursor or keyboard 110 with the terminal 100. This selection process allows a user to select the calendar/task alert files that he wishes to associate with a particular attribute of the event he is sending or one that he sends in the future. The interactive screen 600 also allows him to choose for association among a plurality of audio, video and text files whose names are displayed in display boxes 660, 670, and 680, respectively. These names are the identities of the announcement files 182, 184, and 186 stored in the announcement files library 180.

In operation, the user enters the interface display screen via step 320 and then determines whether he would like to create a new association or replace a current association by selecting (left click) button 690 or button 692 with his cursor. If the button 690 is selected to create a new association, then the user may check any of the six attributes in display boxes 610-650, which represent the attributes of the event as to urgency display routine 610, identity display routine 620, group domain criteria 630, which can include a group name, text, people category time etc., subject line content display routine 640, category display routine 645 or message size display routine 650, respectively. The preceding are only examples of attributes and many other attributes could be listed.

If the user has checked the message urgency attribute display box 610, then he may also select one or all of the subcategories of urgent/high, normal/medium, or low by clicking on the selection bullets 612, 614, or 616. The user, depending upon the selection of the urgency attribute and the subcategory, may then associate one or more announcement files whose names are displayed in display box 660 for audio files, display box 670 for video files, and display box 680 for text files, with the selected attributes. An announcement file is associated with the particular attribute by highlighting the appropriate announcement file box 646 corresponding to the attribute and then by selecting (right click) from the desired display boxes 660, 670 and 680 an announcement file name. Each announcement file box 646 then displays the file name of one or more selected announcement files as associated with that event attribute. More than one announcement file may be selected for each attribute and more than one type of announcement file, audio, text or video may be selected for each attribute. In another exemplary implementation, if a user sets up an appointment and sets a reminder, the user can associate an announcer file with that reminder. For example, when a user sets up a doctor appointment and blocks the time on the calendar, the user can also attach a clip with the reminder that plays an announcement file related to the doctor appointment, such as an audio file of a popular doctor television show.

In a similar manner, the attributes of a recipient identity or a sender identity may be selected in display box 620. Display box 630 allows a user to select a subset of the identity selection by providing for a selection of a part of an identity address, which is the sender address domain or the recipient address domain. The display box 640 allows a user to select as the event attribute the contents of the subject line of the event. For each of the choices of attribute in display boxes 620, 630 and 640, there is also the selection of whether the attribute selected has to be the exact wording of the event or to only contain the selected attribute partially. Display box 645 allows the user to select the attribute of a category of event, based on an emotional criteria such as a happy one, a sad one, etc. or some other category such as from the senders company or from his supervisor. The user, after selection of the attributes in display boxes 620, 630, or 640, proceeds to identify the chosen identity, domain, or subject line by typing into the display boxes 622, 632, or 642 the information that become that attribute criteria. The calendar/task alert files are associated as before by highlighting the display box 646 to which the file corresponds and then by selecting an announcement file from one or more of the file display boxes 660, 670, and 680. After the creation of a new association, the user selects the create new association button 690 and exits back to the sender calendar/task alert application program.

With respect to the recipient identity criteria, the sender of the event may associate one or more announcement files with a recipient in the sender's address book provided by the calendar application. For example, the sender's address book may include a field for each entry for designating an announcement file(s) for a recipient. Further, a sender's address book may include recipient groups, with announcement file(s) associated with the group. If an event is sent to a group, the group associated announcement file takes precedence over any individual announcement files associate with individual recipients in that group. It is understood that the sender calendar/task alert application and recipient calendar/task alert application may operate without reference to an address book and may associate announcement files with electronic messages based on a number of attributes as described herein.

Figure 11:
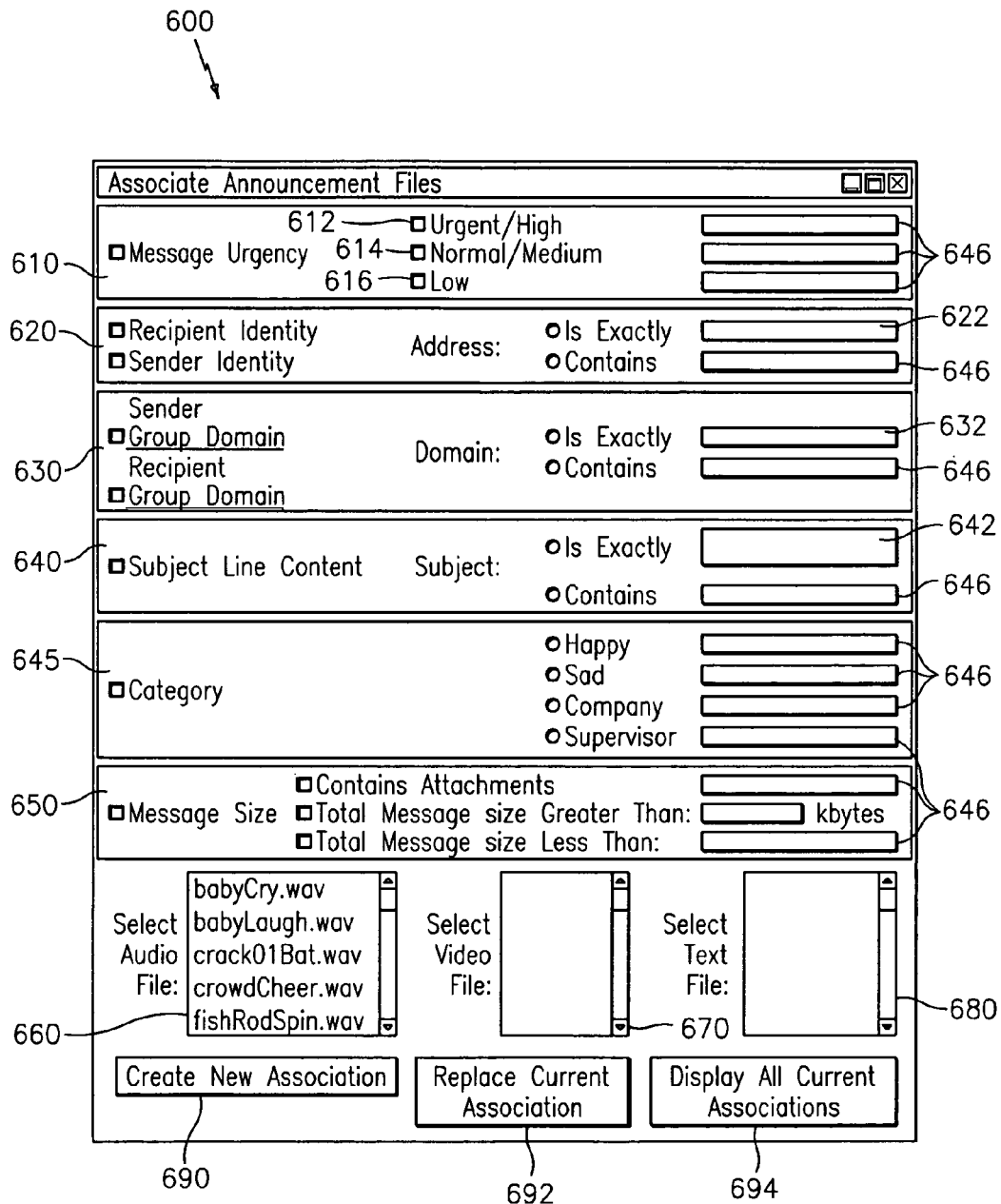
FIG. 11 is a graphical representation of an interactive screen display for associating announcement files and attributes of an electronic message that is called from the sender calendar/task alert application program illustrated in FIG. 8.

As an alternative, upon the interface association screen of FIG. 11 being displayed, if the user wants to replace a current attribute association, he then selects button 692. The mode of operation allows the user to select the particular attribute for which he desires to know the present association in display boxes 610-650 by selecting or deselecting each attribute choice box. After the user has finished his selections, the interface association screen in FIG. 11 displays the corresponding calendar/task alert files previously associated with his present attribute selections. The deselected attributes are blanked. The user may then change the associated announcement file for selected attributes by highlighting the particular announcement file that is to be changed or deleted and by either right clicking (delete) on the presently associated calendar/task alert file or selecting an calendar/task alert file (replace) from display boxes 660, 670 and 680. After the modification of a current association, the user may click again on the button 692 and exit back to the sender calendar/task alert application program.

Figure 12:
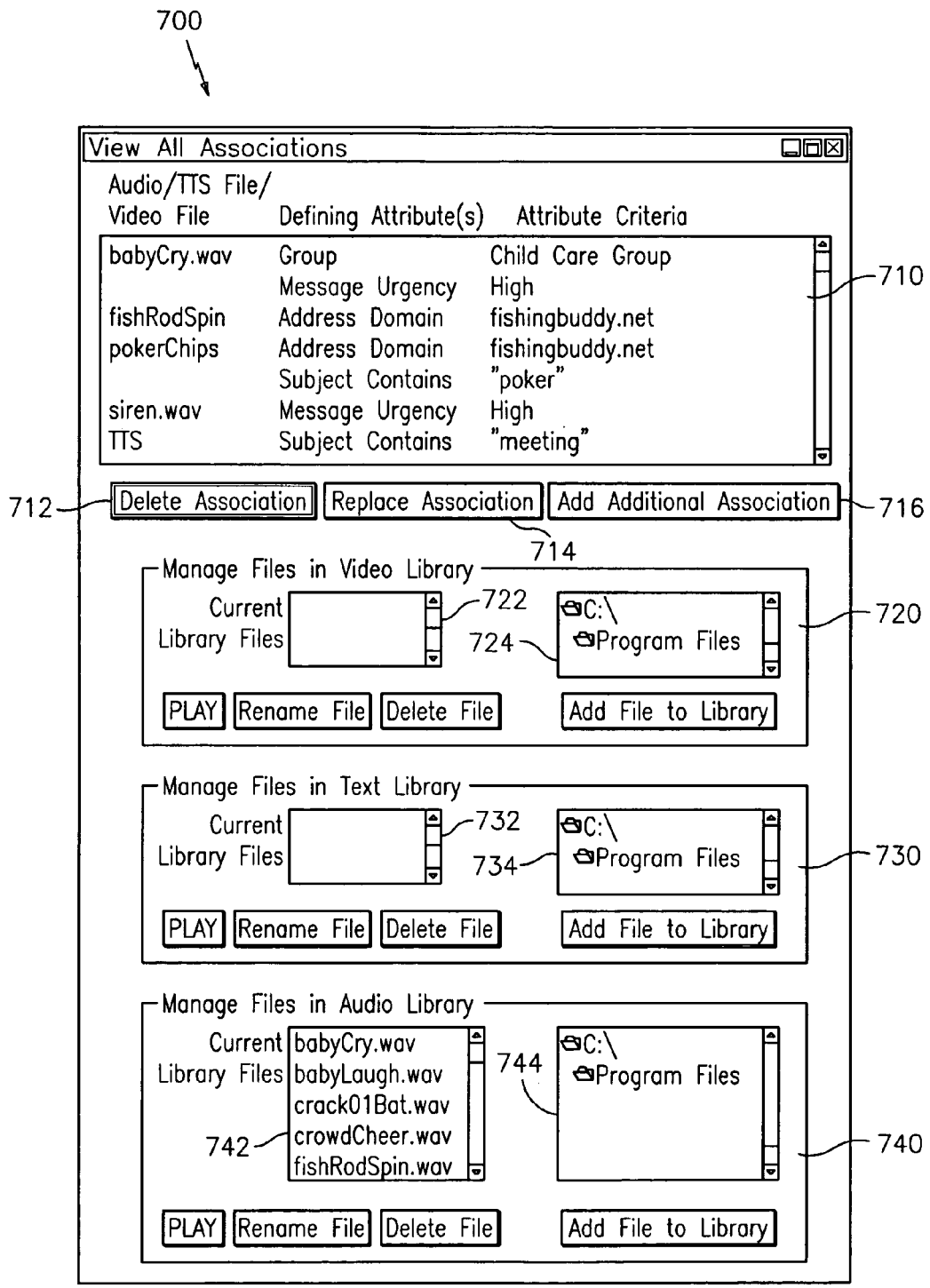
FIG. 12 is a graphical representation of an interactive screen display for viewing and changing announcement file associations of an electronic message that is called from the sender calendar/task alert application program illustrated in FIG. 8.

If the user would like to review all of the associations that he has made, then during the interface association screen in FIG. 11, he selects the button 694 to display all of the current calendar/task alert file associations stored in the associated announcement files library 160 for this user. Selection of the button 692 causes an exit from the display screen in FIG. 11 and causes the program to display the interactive interface display screen 700 in FIG. 12. The display screen in FIG. 12 provides a display of all the presently active associations that the user has made and stored in the library 160 in a scrollable display window 710. The display window is organized as to which announcement files are associated with which defining attributes and what the criteria of those attributes are.

The user may also manage the files in the associated announcement files library 160. By selecting from buttons 712, 714 and 716 the user can delete an association, replace an association, or add an additional association, respectively. The user deletes an association by highlighting that associated announcement in the display window 710 and then by selecting the delete association button 712. The user may also replace an association by highlighting it in the display window 710, selecting its replacement in the display windows 722, 732 or 742 and then by clicking the replace association button 714. A user may also add an association by highlighting a defining attribute in the display window 710, selecting an additional calendar/task alert file from display windows 722, 732, or 742 and then by clicking on the add additional association button 716.

The interface display screen 700 also provides the user with process for management of the files in library 180. In the interactive display screen 700, a display window 722 for the names of the video announcement files 186, a display window 732 for the names of the text announcement files 184, and a display window 742 for the names of the audio calendar/task alert files is provided. The user may view the current announcement files stored in the announcement files library 180 by these windows and manage the library with a several control functions. Optionally, the display screen 700 also provides this announcement file management process where announcement files may be renamed, deleted or added to the library 180. Highlighting a particular calendar/task alert file in a display window 722, 732, or 742 and then selecting the delete file button deletes that announcement file. Similarly, an announcement file is renamed by highlighting it in one of the display windows 722, 732 or 742 and then by selecting the rename file button. This ability allows a type over of the highlighted file by the user from the keyboard 110 to rename the file. The display screen 700 also provides the scrollable display windows 720, 730 and 740 that allow the user to select any file stored on his terminal 100 in the memory 104, which may be either local or peripheral. Once that file is selected by highlighting, it may be added to the particular library file by selecting the corresponding add file to library button. An announcement file in display windows 722, 732 or 742 may be previewed by highlighting the announcement file and selecting a Play button. This allows a sender to preview the announcement file prior to associating the announcement file with a communication. Announcement files may be added in the normal manner to local or peripheral file folders by downloading them, imported from programs loaded on the drive, or the like.

Figure 13:
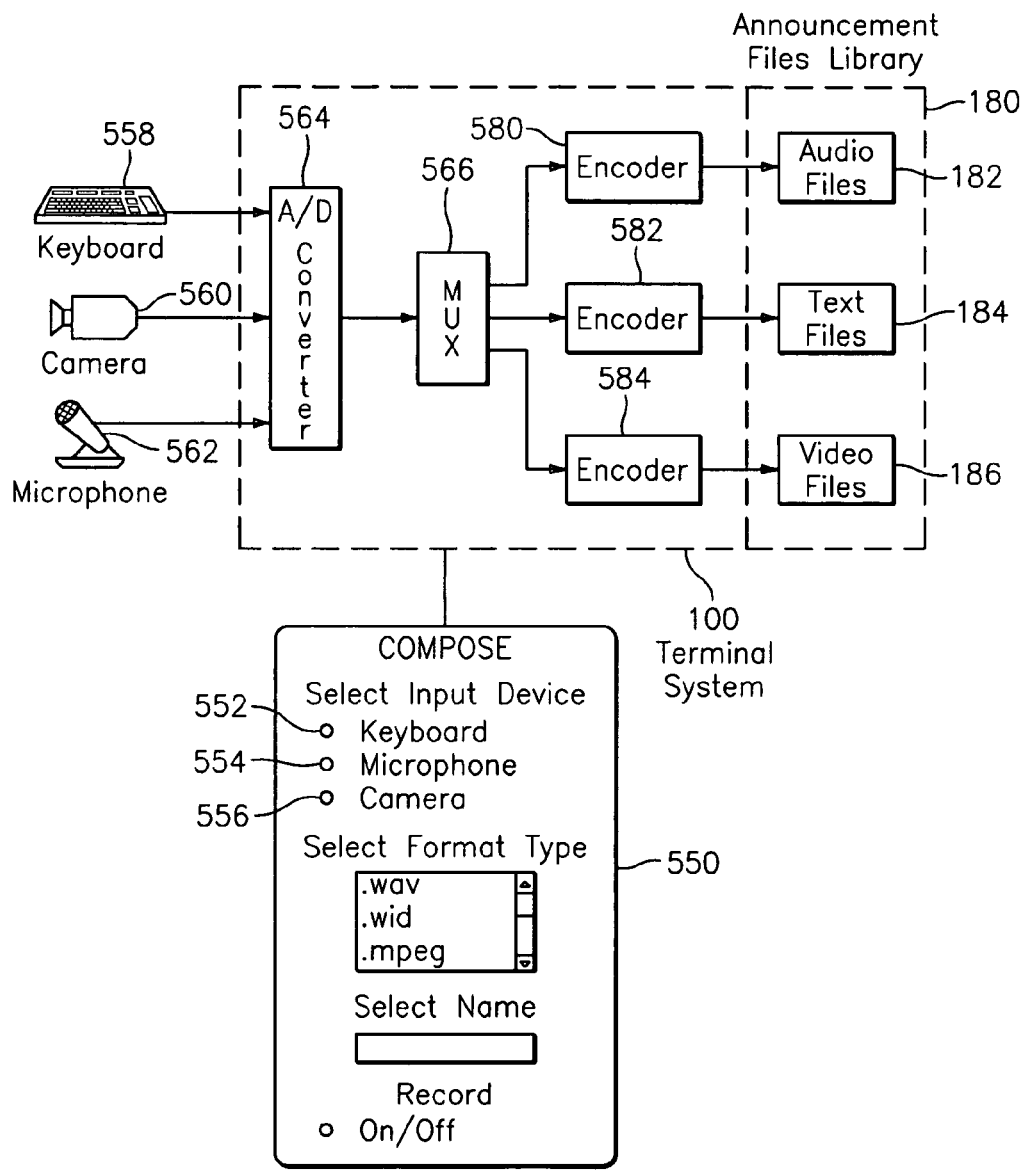
FIG. 13 is a functional block diagram of a feature allowing the user to compose an announcement file for the announcement file library.

Referring to FIG. 13, the compose function of the sender calendar/task alert application program is shown in greater detail. The compose function allows the user to make his own audio, video or text file for the announcements files library 180. The compose function is entered by the user selecting the compose button on the sender announcement utility screen. The selection of the compose button from FIG. 8 causes an interactive screen 550 to be displayed on monitor of the terminal 100.

The interactive screen 550 allows the user to select an input device for composing the announcement file by selecting one of the buttons 552-556. A keyboard 558 can be selected by button 552, a camera 560 can be selected by button 554, or a microphone 512 selected by a button 556. The interactive screen 550 also allows for the choice of the output format of the announcement file from the group of text file/type, video file/type or audio file/type, for example text.wrd, video.mpeg, or audio.wav. The selection of the name of the announcement file may be implemented by typing into the input routine 559 and selecting button 557.

The name selection, type of file, format and input device are used by the compose function to from connections for the chosen input device to the destination of the announcement file in the announcements file library 180. The paths are chosen through an analog to digital converter 564 that converts the analog signal from the camera 560 and the microphone 562 into digital format. The digital input from these two devices and that of keyboard 558 is routed by multiplexer 566 to one of the three memory spaces for audio files 182, text files 184 or video files 186 through encoders 580, 582 and 584, respectively.

For example, if the input device is the keyboard 558 and the format chosen is audio.wav, then the input from the keyboard is directed through the multiplexer 566 and encoder 580 to be stored in audio files 182. The encoder 580 converts the keyed output to .wav format under the file name chosen. If the input device is the keyboard 558 and the format chosen is text.wrd, then the input from the keyboard is directed through the multiplexer 566 and encoder 582 to be stored in text files 184. The encoder 582 converts the keyed output to .wrd format under the file name chosen. If the input device is the microphone 512 and the format chosen is audio.wav, then the input from the microphone is directed through the A/D converter 564, the multiplexer 566 and encoder 580 to be stored in audio files 182. The encoder 580 converts the multiplexer output to a .wav format under the file name chosen. If the input device is the microphone 512 and the format chosen is text.wrd, then the input from the microphone is directed through the A/D converter 564, multiplexer 566 and encoder 582 to be stored in the text files 184. The encoder 582 converts the keyed output to a .wrd format under the file name chosen. If the input device is the camera 560 and the format chosen is video.mpeg, then the input from the camera is directed through the A/D converter 564, multiplexer 566 and encoder 584 to be stored in video files 186. The encoder 584 converts the camera output to an .mpeg format under the file name chosen.

Figure 14:
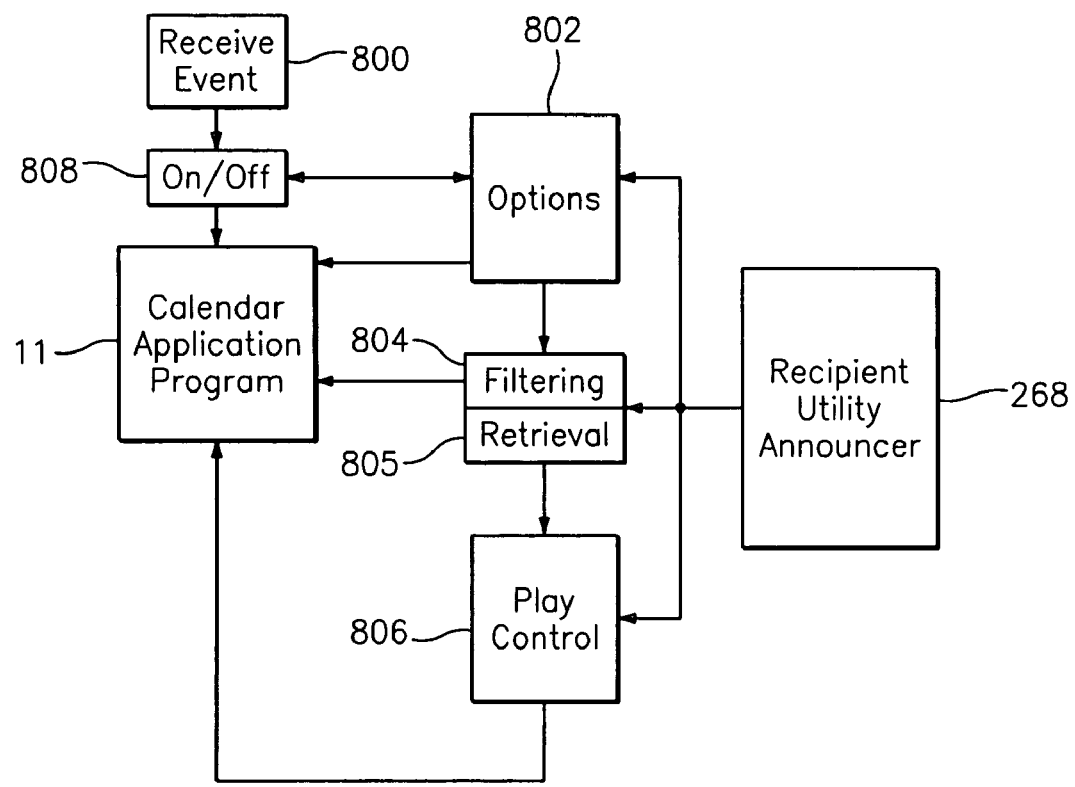
FIG. 14 is a functional block diagram of the recipient calendar/task alert application program called in the flow diagram of FIG. 4.

The recipient calendar/task alert application program allows a recipient to receive events with associated announcement files and to play the announcement files in a controlled manner. FIG. 14 illustrates a functional block diagram of the interaction between the calendar application program 11 and the recipient calendar/task alert application program. The calendar application program 11 contains a portion 800 that detects a received event at the terminal 100 of a recipient. When a received event is detected, it is diverted for processing to the recipient calendar/task alert application program that includes an options section 802, a filtering and retrieval section 804 and a play control section 806. The control of these sections of the program is provided by the interactive screen 268 called in FIG. 5 as the recipient utility. The options section 802 allows the recipient to turn the recipient calendar/task alert function on or off for particular periods of time based upon conditions that he chooses. For example, if he is at work and leaves the office for a meeting, a recipient may turn off the calendar/task alert function. Also, the calendar/task alert function may be turned off during non-work hours and on during work hours automatically.

If the recipient calendar/task alert function is off, then function control routine 808 passes all incoming events to the calendar application program 11 without further processing where it is handled conventionally. If the recipient calendar/task alert function is on, then the event is subject to a series of selectable filters 804 that determines whether the event is an announcement event by having an calendar/task alert ID and associated announcement files to be played, and eliminates certain other events from playing their announcement files based upon characteristics of the event. Those events not selected for playing their announcement files, or those that do not contain announcement files are returned to the calendar application program 11 without further processing where they are handled conventionally. After filtering for non-playable events, the program in retrieval section 805 retrieves those announcement files the recipient has chosen to play from a number of sources. For events having an associated announcement file, the standard new event notification is suppressed. The sources may be diverse and include those attached or associated to the event, or from paths or websites attached or associated with the event.

A play control section 806 then handles the play of the announcement files retrieved. A primary function of the play control 806 is to call the corresponding media players necessary to play the announcement files of an event and then to play them. The play control also functions in combination with the interactive screen 268 to provide utilities for limiting the play time of each announcement file and filtering the announcement file for content. After the announcement files have been played, the events are returned to the calendar application program 11 without further processing where they are handled conventionally.

Figure 15A:
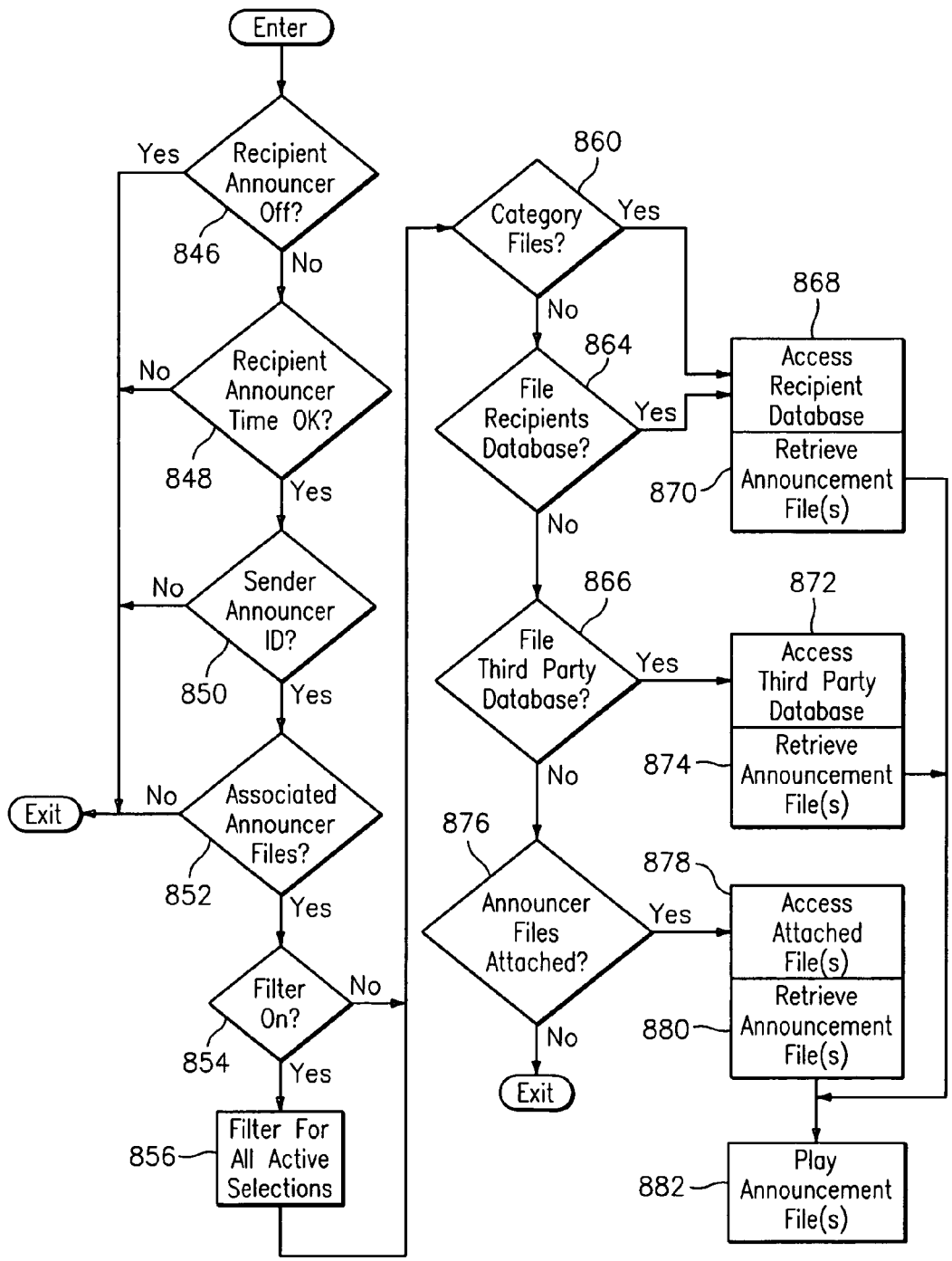
FIGS. 15a and 15b are a flow diagram of the receiver calendar/task alert application program of the terminal illustrated in FIG. 2.
Figure 15B:
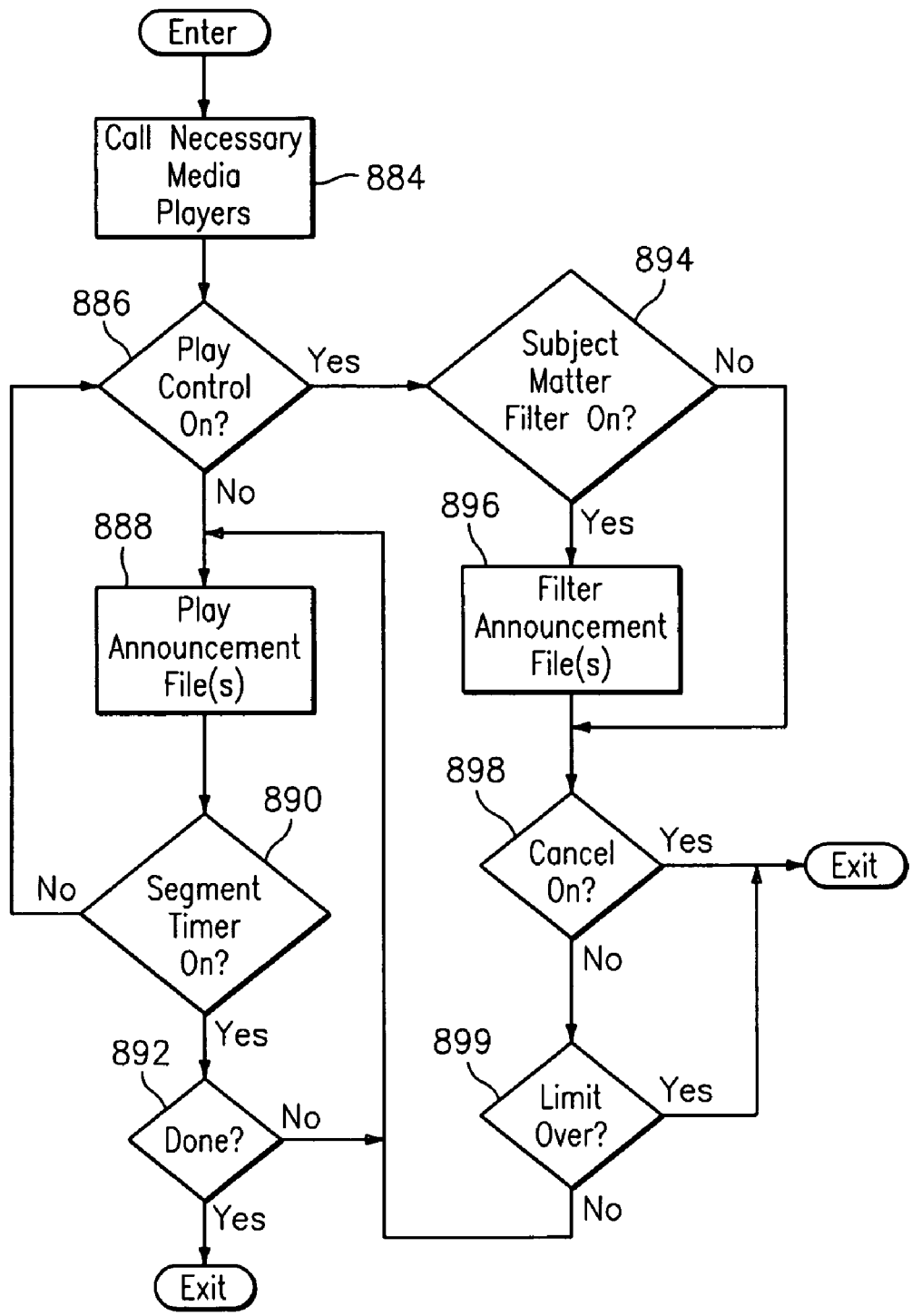

FIGS. 15a and 15b are now be more fully detailed in explanation of the recipient calendar/task alert application program that is entered in step 846 from the detection of a received event by program portion 800 of the calendar application program 11 and step 208 in FIG. 4B. The program tests whether the recipient calendar/task alert function is turned on in step 846 and whether the recipient calendar/task alert program is outside its allowed operational time in step 848. If either of these tests is passed the event is allowed to continue to calendar application program 11 where it is handled in a conventional manner. If both tests are failed, the event is diverted and tested in steps 850 and 852 to determine the operation. The received event is examined in step 850 to determine if a sender calendar/task alert ID is found in the header and in step 852 to determine if the event has any announcement files associated with it.

If the information in the header indicates that the answer is yes and there are announcement files, then the program continues to its subsequent parts to determine what those calendar/task alert files are and how to play them for the recipient. If there are no calendar/task alert files associated with the event or the event is not a calendar/task alert event, the program exits and returns to the point from which it exited the calendar/task alert application program in step 212 of FIG. 4B. While the information concerning the associated announcement files may be conveyed anywhere in the event, or for that matter in an attached or even a separate associated file, it is very convenient to convey them in the event header in a standardized format.

The program then checks in step 854 whether any of the filters are on and, if the test is affirmative, the event is filtered in step 856 for all criteria for each filter that is active. Those events that are filtered out are returned to the calendar application program 11 for conventional handling. For those events that pass the active filtering, a series of tests in steps 860, 864, 866 and 87 are entered to determine where the announcement file to be played is located. In step 860, the category type of announcement file is checked for in the event. If found, the program accesses the data base of the recipient in step 868 and retrieve the announcement file in step 870 that the recipient has associated with that category. Additionally, if the information in the header indicates that the announcement file(s) reside in the database of the recipient in step 864, then the program accesses those data bases in step 868, finds the associated files and retrieves those calendar/task alert file(s) in step 870. In step 876 the program determines if the announcement file is associated as an event attachment, and if confirmed, retrieves that the attachment(s) in steps 878 and 880 in a conventional manner. The retrieved announcement file(s) can be an audio, video, or text file(s), or combinations thereof, and are then transferred to step 882 where the appropriate audio, video, text, or combinations thereof, media players for the file(s) are called and the audio, video, text, or combination thereof, announcements are made, respectively. The recipient may also be given the option to save the announcement file to add the announcement file to their library or forward the announcement file to another recipient. When finished announcing an event, the program returns to the point from which it exited the calendar/task alert application program in step 210 of FIG. 4B.

If the announcement file cannot be accessed through steps 864, 866 or 876, or the announcement file has been corrupted/unplayable, then system provides an indication that an event announcement was included but could not be correctly played. This prevents the recipient calendar/task alert application from locking up trying to locate or play an announcement file that cannot be resolved.

FIG. 15b is an exemplary implementation of step 882 of FIG. 15a when the system has the option of a play control. The program enters when all of the announcement files have been retrieved and the necessary media players for announcing these files have been called in step 884. If the play control function has not been turned on, the program continues to step 888 where they announcement files are played for a segment of time determined by step 890. After each segment is played, the timer in step 890 times out and the program loops back to determine if the Play control is on in step 886. During the on time of the segment timer, the announcement files are played by looping through steps 888, 890 and 892 until all files have been played. The program then exits to step 210 in FIG. 4.

When the play control is on, the program transfers to step 894 where the test of whether a subject matter filter has been selected is made. If the subject matter filter has been selected, the announcement file is filtered in step 896 for the subject matter desired whether it be inappropriate language, certain themes, etc. before continuing. Next the program in step 898 determines if the cancel function has been made active. If the user has decided to cancel the rest of an announcement, the program exits. Otherwise, the program continues to a test in step 899 for a time limit on the announcement. If the announcement has exceeded the predetermined limit that has been set for it, then the program exits from the yes branch of the test. If the time limit set for the announcement has not been reached, then the program loops back to step 888 where another segment of the announcement is played. The program checks for the time limit and the end of every play segment through the path of steps 886, 894, 896, 898, and 899, until the announcement ends or the time limit is reached at which point the program exits.

Figure 10:
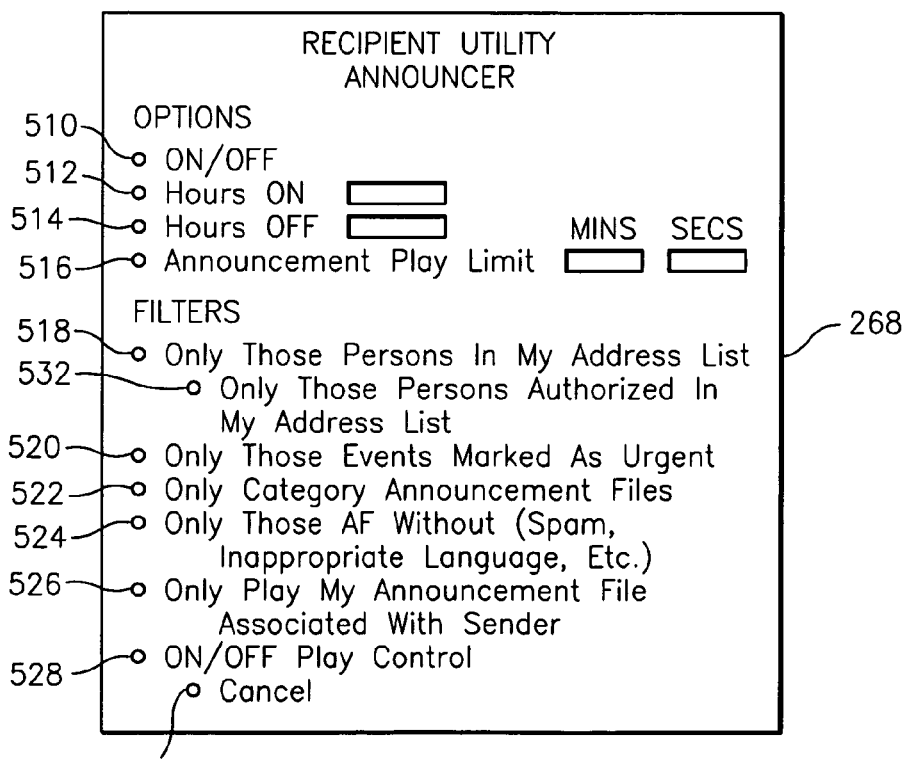
FIG. 10 is a pictorial representation of the interactive screen control for the recipient calendar/task alert application program illustrated in FIG. 15.

FIG. 10 is a representative pictorial of the interactive screen 268 that is displayed when the utility program for the recipient calendar/task alert application program is called. This screen allows the user to command the recipient calendar/task alert program to control the playing of the associated announcement files and provides defaults and other optional functions. The screen 268 provides a series of selection buttons 510-530 that can be selected by clicking on them with the cursor 110 of the terminal 100. The status of each button is then stored in the memory of the terminal 100 where the recipient calendar/task alert application program can read that status and respond accordingly.

The user may initially select with the screen 268 on, the options of whether the recipient calendar/task alert function is off or on with selection button 510, whether there are certain times of the day when the recipient calendar/task alert function should be on with selection button 512, or whether there are certain times of the day when the recipient calendar/task alert function should be off with selection button 514. Corresponding entry blocks to the options allow the user to select the hours desired for the particular option. The selection button 510 overrides the selection buttons 512 and 514 so that the user may turn the recipient calendar/task alert function on or off for time periods chosen by the user without having to reset the normal default hours.

Other functions the recipient can use to control the play of the sender associated announcement files are a series of filters chosen by select buttons 518-526 and 532. An event may be examined for its characteristics and those events having characteristics that the recipient has chosen to filter out do not have their announcement files played. The events that are filtered out are returned to the calendar application program 11 where they are handled normally by that program. Select button 518 filters out all events from persons not in the address book of the calendar application program 11 of the recipient. Selecting button 532 filters out events from all senders not in the address book of the recipient and those in the address book who not authorized to send events with associated announcement files. Selecting button 520 allows playing those announcement files associated with events marked as urgent. Selecting button 522 filters the events for those with category indications, whether with associated announcement files or without. This filter then plays the announcement file of the recipient, if any, associated with the category indicated by the sender. Another associated filter is chosen by selecting button 526 which plays the announcement file that the recipient has associated with the sender, if any.

After the options and filters have selected an event that has its associated announcement files or the recipient's announcement files, the user may also select how these announcement files are played with a play control selection button 528. If the section button 528 is off, there is no play control and the program plays the announcement files as they are found. However, if the play control is on by selecting button 528, then the user may also select a cancel button 530 to immediately end the play of an announcement file while it is being played. Additionally, before an announcement file is played and if the play control is on, a filter may be selected by button 524 to eliminate those announcement files with objectionable content. Also, if the play control is on, the user may select the maximum time an announcement file may play by selecting button 516 and by entering a time limit with input device 110 in the corresponding entry blocks for mins. and secs.

As discussed above, calendar servers 28 and 30 in the intranets 24 and 26 may also perform the filtering and blocking of announcement files. This allows an organization to apply filters controlling the distribution of announcement files. The calendar/task alert administrator programs executing on servers 28 and 30 include associations and filters as discussed above. The sending and receiving of calendar/task alert files may be permitted or prohibited based on attributes of the sender, receiver and/or the electronic message. For example, announcement files may be permitted for internal events (e.g., recipient addresses on the intranet) but blocked for external network addresses. Thus, the control of announcement files, either by the sender or the recipient, may be executed at the network level by a calendar/task alert administrator program executing on a calendar server applying blocking and routing criteria based on attributes of the electronic message.

As described above, both the sender and the receiver may associate announcement files on an individual basis. For example, Sam may associate file A with Randy, and Randy may associate file B with Sam. When Sam sends an event to Randy, the calendar/task alert application must determine which announcement file to play indicating receipt of the event. In exemplary embodiments, the recipient's associated announcement file overrides the sender associated announcement file such that the recipient controls announcements at their system. The recipient may select a function to turn-off the override feature so that the sender associated announcement file is played. Further, the recipient may impose conditions on the override ability. For example, the recipient may wish to have announcement files in certain categories (e.g., emergency category) played, regardless of the recipient's override instructions. Thus, the receiver can customize which announcement files are to be played based on the sender (e.g., individual control) or the situation (e.g., based on category of the announcement file).

The calendar calendar/task alert application may also have administrative controls that are established by the installer or maintainer of the applications. These administrative controls may be established and altered only by administrative personnel (e.g., IT personnel). Such controls may be implemented on individual terminals or on calendar servers. These controls establish global controls such as acceptable content, size and frequency of announcement files. Further, override management may be controlled through the global controls.

For example, in a business organization, rank within the entity may be used to resolve a conflict between a sender announcement file and a recipient announcement file (e.g., the higher ranking individual's announcement file is played).

The recipient terminal may generate a notification to the sender terminal that the associated announcement file was played at the recipient terminal. In the event that a sender's associated announcement file is not played at the recipient terminal, the recipient terminal may send notification of this event to the sender. In embodiments, the notification is a reply event to the sender stating that the sender associated announcement file was not played at the recipient terminal. In other embodiments, the notification is a reply event stating that the sender associated announcement file was not played and also indicating what announcement file was played. The recipient may block the transmission of the notification to the sender through a user option menu. Similarly, the sender may block receiving the notification from the recipient through a similar user option.

If a recipient is not present when an announcement file is played, embodiments allow the recipient to mark an event as unread or new so that the announcement file can be played again. Most calendar applications include a function for marking events as unread or new. Alternatively, embodiments of the invention include an announcement icon or button that may be used when an event is selected. To play an announcement file, the recipient selects an event in their calendar application and then selects the announcement button. This causes the calendar/task alert application to play the announcement file. It is understood that often, events can also be sent as an email, which is coupled to the recipient's calendar program. Therefore, it is understood that an event can be received by email, during which the announcement file can be played upon the recipient reading the email, which is marked as a calendar event. In other embodiments, the recipient (user) can have the ability to save the announcement file to their desktop or a collection of .wav files, or other storage area, for their own use at another time. Alternatively, the user can have the option to save the announcement files prior to declining the calendar invite, or deleting the calendar/task event, or reminder. In addition, the user can have the option to play an announcement file at a later time. For example, if the user has the announcement application turned off early in the day and several calendar events arrive and some reminder pop-up, and the user does not hear the announcement, the user can have the option to play the announcement files at a later time. In one exemplary implementation, the user can choose an option to play the announcement file later on the pop-up window. In another exemplary implementation, the user can reset a reminder time, which allows the reminder to play the announcement file at the reset time.

Announcement files may be subject to existing digital rights management (DRM) features to prevent unauthorized distribution of the announcement files. As described above, embodiments of the invention allow a user to purchase announcement files. These announcement files may be encoded for use on a single terminal, a limited time, a limited number of transmissions, etc. Those skilled in the art recognize various DRM mechanisms that may be used on the announcement files.

The sender associated announcement files in other embodiments advantageously provide a marketing method. The sender associated announcement files are a convenient and inexpensive way for makers of various products and services to communicate with consumers and theoretically receive immediate feedback of their efforts.

It is therefore appreciated that the embodiments of the systems and methods described herein can be implemented with several online and e-commerce capabilities. In exemplary implementations, when a user makes a purchase online and receives a confirmation email, the person can be given the option to add any time-sensitive information such as calendar/task or reminder information to the user's calendar. For example, if a the user purchases a calendar ticket from TicketMaster®, the user receives a confirmation email, stating that the ticket purchase has been made for a particular time and location. The email could then ask whether or not the user wants to place the event on the user's calendar. The email could provide a link to take such action. If the user does accept the offer to add the event to the calendar, then the information is added. As the date becomes closer, a pop-up reminder can be displayed, along with an aural clip of a song by the group playing the concert.

In another e-commerce example, the user could purchase a book from Amazon® and receive a confirmation message along with an expected arrival date of the shipment. The email can include a link that places the confirmation date on the user's calendar. The user then clicks the "put on calendar" link to remind the user that of the expected confirmation date to receive the book. As the date becomes closer, the pop up displays, along with an ad from Amazon that may also display a section of the book I ordered, a recommendation for a similar book.

The marketing embodiments as described allow providers of goods and services to capture a recipient's attention through the use of announcement files that are played upon the commencement of a calendar/task on a calendar. The recipient can generally control this marketing by opting not to add the provider's link, as described.

As described above, the exemplary embodiments can be embodied in the form of computer-implemented processes and apparatuses for practicing those processes. The exemplary embodiments can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the embodiments. The exemplary embodiments can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the embodiments. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Further, the processes described are not necessarily to be performed only in the sequence illustrated or each step only at the time indicated. Therefore, it is intended that the invention not be limited to the particular embodiment disclosed as the best mode contemplated for carrying out this invention, but that the invention will include all embodiments falling within the scope of the appended claims.

The invention claimed is:

1. A method for distributing and managing electronic information between a sender and a recipient, the method comprising:
    creating at least one of an event and a schedule of events on an application on a sender terminal, wherein the electronic message for events comprises the at least one of the event and the schedule of events;
    identifying at least one of a user and a group of users associated with said schedule of events, at least one of the users and each member of the group of users having a recipient terminal;
    associating a multimedia announcement file with an electronic message for events, the multimedia announcement file configured for playing at a recipient terminal upon occurrence of at least one of the event and the schedule of events
    wherein associating the multimedia announcement file with the electronic message for events comprises:
        the application of the sender terminal inspecting attributes of the least one of the event and the schedule of events;
        the application of the sender terminal determining and selecting the multimedia announcement file to associate with the electronic message for events from a plurality of announcement files by matching the attributes of the least one of the event and the schedule of events to attributes of the multimedia announcement file from the plurality of multimedia announcement files;
            an association function matches the attributes of the electronic message for events with at least one of the multimedia announcement files of the plurality of multimedia announcement files to include at least one multimedia announcement file with the electronic message, wherein associating an attribute of the electronic message with the multimedia announcement file includes using message urgency, a sender address and a subject of the electronic message to associate the electronic message with the at least one multimedia announcement file;
            wherein the multimedia announcement file includes a first bit defining one of a directly accessed multimedia announcement file or an address to the multimedia announcement file, a second bit defining the type of the multimedia announcement file and the multimedia announcement file compression parameters when compression parameters are defined, a third bit defining the types of indirect paths to the multimedia announcement file;
            wherein the attaching the multimedia announcement file to the electronic message includes defining an announcer identifier in a message header, the announcer identifier including a first bit defining the presence of an multimedia announcement file, a second bit defining the number of multimedia announcement files associated with the message;
        the application of the sender terminal associating the multimedia announcement file selected from the plurality of multimedia announcement files to the least one of the event and the schedule of events; and
    broadcasting the electronic message of events comprising the at least one of the event and the schedule of events over a network to the at least one of the user and the group of users.

2. The method as claimed in claim 1 wherein the electronic message for events includes at least one of a calendar invite, invite and task.

3. The method as claimed in claim 1 further comprising identifying an announcement that uniquely associates a subset of said schedule of events with a subset of said group of users;
    wherein associating the announcement file includes associating the announcement file in response to the sender of said subset of said schedule of events to alert said subset of group of users of particular interest in said subset of said schedule of events.

4. The method as claimed in claim 3 wherein associating the announcement file includes associating the announcement file in response to at least one of the urgency of said subset of said schedule of events, and the content of said subset of said schedule of events.

5. The method as claimed in claim 1 wherein associating the announcement file includes associating the announcement file to a group-type.

6. The method as claimed in claim 1 wherein associating the announcement file includes associating the announcement file to a keyword.

7. The method as claimed in claim 1 wherein the associating includes associating a multi-media file with said subset of said schedule of events.

8. The method as claimed in claim 7 wherein the multimedia file is at least one of an audio file, a video file, and a combination audio/video presentation file.

9. The method as claimed in claim 3 wherein the associating includes attaching the announcement file to said subset of said schedule of events.

10. The method as claimed in claim 1 wherein the associating includes associating at least one link to the announcement file.

11. The method as claimed in claim 10 wherein the link to the announcement file is a hyperlink to an announcement file stored on at least one of a third-party server, recipient's files and an intra-net server.

12. The method as claimed in claim 10 wherein the link to said announcement file is a hyperlink to a codec used to play said announcement file.

13. A system for sharing electronic information among a group on a network, the system comprising:
    a sender terminal having an application linked to the group and for creating a schedule of events that is available to the group;
    an associated multimedia announcement file library including a plurality of multimedia announcement files and a matrix of announcement associations associating an multimedia announcement file with said schedule of events;
    an association function matching said schedule of events with the multimedia announcement associations to associate the announcement file with said schedule of events, wherein the sender terminal is coupled to the association function;
    wherein to associate the multimedia announcement file with the schedule of events comprises:
        the association function coupled to the sender terminal inspecting attributes of said schedule of events;
        the association function coupled to the sender terminal determining and selecting the multimedia announcement file to associate with said schedule of events from the plurality of multimedia announcement files by matching the attributes of said schedule of events to attributes of the multimedia announcement file from the plurality of multimedia announcement files;

the association function matches the attributes of the electronic message for events with at least one of the multimedia announcement files of the plurality of multimedia announcement files to include at least one multimedia announcement file with the electronic message, wherein associating an attribute of the electronic message with the multimedia announcement file includes using message urgency, a sender address and a subject of the electronic message to associate the message with the at least one multimedia announcement file;

wherein the announcement file includes a first bit defining one of the a directly accessed announcement file or an address to a multimedia announcement file, a second bit defining the type of the multimedia announcement file and multimedia announcement file is compression parameters, a third bit defining the types of indirect paths to the multimedia announcement file;

wherein the attaching the multimedia announcement file to the electronic message includes defining an announcer identifier in a message header, the announcer identifier including a first bit defining the presence of an multimedia announcement file, a second bit defining the number of multimedia announcement files associated with the message;

the association function coupled to the sender terminal associating the multimedia announcement file selected from the plurality of multimedia announcement files to said schedule of events.

14. The system as claimed in claim 13 further comprising a plurality of recipient terminals, each having an application for receiving said schedule of events.

15. The system as claimed in claim 14 wherein said application on sender terminal and said application on each of said plurality of recipient terminals are both a shared calendar and event task application.

16. The system as claimed in claim 14 wherein the announcement file is configured for executing concurrently with occurrence of said schedule of events upon receipt of said announcement file on a recipient terminal among said plurality of recipient terminals.

17. The system as claimed in claim 16 wherein said announcement file executes if the announcement file is associated with at least one of a keyword and a group-type.

18. The system as claimed in claim 16 wherein said announcement file is associated with a subset of said schedule of events if the announcement file is associated with at least one of a keyword and a group-type.

19. A computer program product for providing shared calendar events over a network coupled to a plurality of computers, the computer program product tangibly stored on a non-transitory computer readable medium including computer executable instructions for implementing a method on a sender computer comprising:

creating a calendar event;
identifying at least one user of a plurality of computers who have an interest in said event, thereby identifying said event as a shared calendar event;
associating said at least one user with a group having the ability to receive the shared calendar event;
associating a multimedia announcement file with said shared calendar event;
wherein associating the multimedia announcement file with the electronic message for events comprises:
the computer readable instructions of the sender computer inspecting attributes of the shared calendar event;
the computer readable instructions of the sender computer determining and selecting the multimedia announcement file to associate with the shared calendar event from a plurality of multimedia announcement files by matching the attributes of the shared calendar event to attributes of the multimedia announcement file from the plurality of multimedia announcement files;
an association function matches the attributes of the calendar event with at least one of the multimedia announcement files of the plurality of multimedia announcement files to include at least one multimedia announcement file with the calendar event, wherein associating an attribute of the calendar event with the multimedia announcement file includes using message urgency, a sender address and a subject of the calendar event to associate the calendar event with the at least one multimedia announcement file;
wherein the multimedia announcement file includes a first bit defining one of the a directly accessed multimedia announcement file or an address to a multimedia announcement file, a second bit defining the type of the multimedia announcement file and multimedia announcement file compression parameters, a third bit defining the types of indirect paths to the multimedia announcement file;
wherein the attaching the multimedia announcement file to the calendar event includes defining an announcer identifier in a message header, the announcer identifier including a first bit defining the presence of an multimedia announcement file, a second bit defining the number of multimedia announcement files associated with the calendar event;
the computer executable instructions of the sender computer associating the multimedia announcement file selected from the plurality of announcement files to the shared calendar event; and
wherein the associating said multimedia announcement file causes said multimedia announcement file to execute when said shared event occurs.

20. A system having a shared calendar application for distributing calendar and task events over a network among a plurality of computers including:
the plurality of computers configured to:
create an event using the shared calendar application on a sender computer;
identify users of the plurality of computers who have an interest in said event;
associate said users with a group;
associate a multimedia announcement file that is executable concurrently with said event when said event occurs for said group;
wherein the associating the multimedia announcement file with said event comprises:
the shared calendar application on the sender computer inspects attributes of said event;
the shared calendar application on the sender computer determines and selects the multimedia announcement file to associate with said event from a plurality of multimedia announcement files by matching the attributes of said event to attributes of the multimedia announcement file from the plurality of multimedia announcement files;

wherein an association function matches the attributes of the event with at least one of the multimedia announcement files of the plurality of multimedia announcement files to include at least one multimedia announcement file with the event, wherein associating an attribute of the event with the multimedia announcement file includes using message urgency, a sender address and a subject of the event to associate the event with the at least one multimedia announcement file;

wherein the multimedia announcement file includes a first bit defining one of the a directly accessed multimedia announcement file or an address to a multimedia announcement file, a second bit defining the type of the multimedia announcement file and multimedia announcement file compression parameters, a third bit defining the types of indirect paths to the multimedia announcement file;

wherein the attaching the multimedia announcement file to the event includes defining an announcer identifier in a message header, the announcer identifier including a first bit defining the presence of an announcement file, a second bit defining the number of announcement files associated with the event; distribute said event to said group.

* * * * *